US008425825B2

(12) United States Patent
Albonetti et al.

(10) Patent No.: US 8,425,825 B2
(45) Date of Patent: Apr. 23, 2013

(54) APPARATUSES AND METHODS FOR MAKING SEAL RINGS FOR CAPS, AND THUS OBTAINED SEAL RINGS

(75) Inventors: Danilo Albonetti, Sasso Morelli (IT); Stefano Bergami, Castel San Pietro Terme (IT); Fabrizio Villa, Imola (IT)

(73) Assignee: Sacmi Coopertiva Meccanici Imola Societa' Cooperativa (IT)

( * ) Notice: Subject to any disclaimer, the term of this patent is extended or adjusted under 35 U.S.C. 154(b) by 172 days.

(21) Appl. No.: 12/989,190

(22) PCT Filed: Apr. 21, 2009

(86) PCT No.: PCT/IB2009/005315
§ 371 (c)(1),
(2), (4) Date: Jan. 11, 2011

(87) PCT Pub. No.: WO2009/130567
PCT Pub. Date: Oct. 29, 2009

(65) Prior Publication Data
US 2011/0100994 A1    May 5, 2011

(30) Foreign Application Priority Data
Apr. 22, 2008  (IT) .............................. MO2008A0116

(51) Int. Cl.
*B29C 70/80*  (2006.01)

(52) U.S. Cl.
USPC .......................... 264/267; 264/268; 264/299

(58) Field of Classification Search .................. 264/267, 264/268, 299
See application file for complete search history.

(56) References Cited

U.S. PATENT DOCUMENTS

| 3,689,625 | A | * | 9/1972 | Zipper .......................... 264/268 |
| 5,686,040 | A | * | 11/1997 | Taber ............................ 264/268 |
| 2005/0067735 | A1 | | 3/2005 | Kaufman |
| 2007/0071981 | A1 | | 3/2007 | Bergami et al. |
| 2007/0134361 | A1 | | 6/2007 | Ritz et al. |
| 2008/0087627 | A1 | | 4/2008 | Zuffa et al. |

FOREIGN PATENT DOCUMENTS

| EP | 1837155 A1 | 9/2007 |
| JP | 07276394 A | 10/1995 |
| WO | 2005092603 A1 | 10/2005 |

* cited by examiner

*Primary Examiner* — Joseph S Del Sole
*Assistant Examiner* — James Sanders
(74) *Attorney, Agent, or Firm* — Laubscher & Laubscher, P.C.

(57) ABSTRACT

An apparatus for forming an object from plastics material includes a forming arrangement having a recess for forming an edge zone of the object, the recess extending around an internal region of the forming arrangement and a conduit cooperating with a piston device to supply the plastics material to the recess, the conduit leading into the internal region into a position contiguous with the recess.

12 Claims, 31 Drawing Sheets

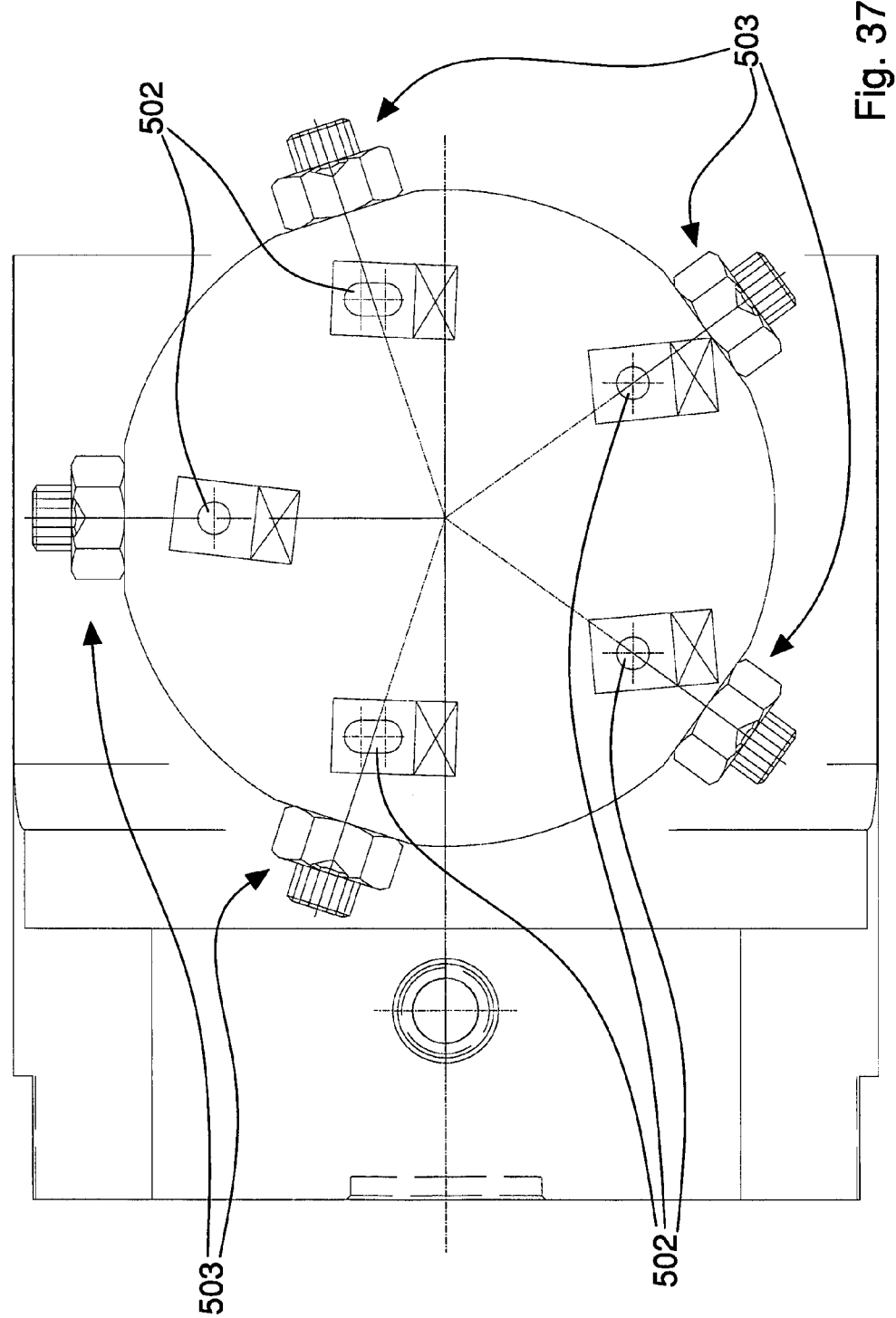

APPARATUSES AND METHODS FOR MAKING SEAL RINGS FOR CAPS, AND THUS OBTAINED SEAL RINGS

This application is the National Stage entry of PCT International Application No. PCT/IB2009/005315 filed Apr. 21, 2009. PCT/IB2009/005315 claims priority to IT Application No. MO2008A000116 filed Apr. 22, 2008. The entire contents of this application are incorporated herein by reference.

The invention relates to apparatuses and methods for obtaining an object provided with an edge zone that extends around a central space, particularly an annular object such as a seal suitable for being associated with caps for closing containers, for example bottles or jars. The invention further relates to a seal associable with caps of containers.

Caps are known comprising an end wall having a circular plan shape and a side wall provided with a fixing arrangement that enable the cap to be fixed in a removable manner to a neck of a container, for example a bottle. On the end wall there is provided a seal that usually comprises a relatively thin full central disc and a thicker annular zone that in use is arranged in contact with an edge of the neck of the bottle so as to prevent the substances contained in the bottle from escaping into the external environment and to prevent the substances present in the environment from contaminating the contents of the bottle. The seal may, for example, be formed by compression-moulding depositing inside the cap a dose of plastics in fluid or semifluid state and shaping the dose with a punch directly inside the cap.

One drawback of the seals of the type disclosed above is that they require high consumption of plastics, especially for forming the full central disc, that is of no utility during use because the sealing action is exerted exclusively by the annular zone.

In order to reduce the quantity of plastics necessary for making a seal, PCT/IB2005/003054 discloses a seal comprising an annular zone suitable for engaging with the edge of the neck of the bottle and an internal region arranged inside the annular zone and connected thereto by a plurality of bridge elements. Between two adjacent bridge elements a through hole is obtained that enables the quantity of plastics consumed to be reduced.

The solution disclosed in PCT/IB2005/003054, whilst being an improvement on the seals with a full central disc, uses a not insignificant quantity of plastics in zones that exert no sealing action. In fact, both the internal region and the bridge elements constitute a limit in the attempt to diminish the quantity of plastics necessary for forming the seal.

Also the seals according to PCT/IB2005/003054 thus require a relatively great quantity of plastics, which entails high costs and grave environmental repercussions.

Apparatuses are further known for obtaining seals from a liquid. Plastics in liquid state, coming from a tank, are applied by a pistol to the internal surface of a cap, such as to shape an annular element. The latter, after possibly being centrifuged, is left to dry and heated such as to harden, so as to form the seal.

A drawback of the apparatuses for obtaining seals from a liquid is that they do not enable the shape of the seal to be controlled after the plastics have been applied to the internal surface of the cap. Consequently these apparatuses produce seals having a rather irregular shape.

Further, in known apparatuses, it is not possible to dose with precision the quantity of liquid dispensed.

Lastly, only a limited range of plastics are suitable for being applied to the cap in liquid state. Further, current legislations in the food field are rather restrictive with regard to the types of plastics that can be used to make seals. This makes it possible to form seals from a liquid with a very small number of plastics, which makes this system inflexible.

Italian patent application BO96A000538 discloses an apparatus for forming seals comprising a carousel on which are mounted a plurality of separating elements for separating doses of plastics from an extruder. The separating elements drop the doses inside a heated conduit in which the doses are compacted to form a continuous cylinder of plastics. From the heated conduit, the plastics pass to a plurality of radial conduits that dispense the plastics onto the cap so as to form an annular element.

The apparatus disclosed in BO96A000538 has a very complicated structure owing to the presence of the carousel supporting the separating elements, the heated conduit and the radial conduits. Further, high energy consumption is necessary to heat the plastics inside the heated conduit. U.S. Pat. No. 5,686,040 shows a process for making a seal for caps of containers in which thermoplastic elastomeric material is deposited in a melted state under pressure on the periphery of the internal surface of the cap and is then compression-moulded directly on the cap by means of a punch.

An object of the invention is to improve the apparatuses and the methods for forming an object provided with an edge zone that extends around a central space, for example an annular object such as a seal for containers.

A further object is to improve the seals suitable for being associated with edges of containers, for example bottles or jars.

Another object is to reduce the quantity of material necessary for forming objects provided with an edge zone that extends around a central space, so as to reduce the costs thereof and to reduce the environmental impact thereof.

Another object is to provide apparatuses and methods that enable seals to be obtained that have a controlled shape. Another object is to provide apparatuses and methods for forming seals from plastics that enable the quantity of plastics used for forming a seal to be dosed with precision. Another object is to provide apparatuses and methods that enables seals with a wide range of plastics to be provided. A further object is to simplify the apparatuses and the methods used for forming seals.

In a first aspect of the invention, there is provided an apparatus for forming an object from plastics, said apparatus comprising:

a forming arrangement having a recess for forming an edge zone of said object, said recess extending around an internal region of said forming arrangement;

a conduit cooperating with a piston device to supply said plastics to said recess;

wherein said conduit leads into said internal region, into a position contiguous with said recess.

In a second aspect of the invention, there is provided a method for forming an object from plastics, said method comprising the step of shaping said plastics in a recess to obtain an edge zone of said object, said recess extending around an internal region, wherein said plastics are supplied to said internal region in a position contiguous with said recess, so as to reach said recess flowing from said internal region.

Owing to the first and second aspect of the invention it is possible to reduce the quantity of plastics necessary to obtain an object having an edge zone. In fact, the plastics are supplied in a position contiguous with the recess in which the edge zone will be formed, which enables the long connecting paths to be avoided that in PCT/IB2005/003054 connected the zone in which the plastics were supplied to the edge zone of the object.

In a third aspect of the invention a seal is provided that is associable with a cap of a container, comprising an edge zone suitable for engaging an edge of said container, said edge zone extending around an empty space, wherein it comprises an appendage that is contiguous with said edge zone and projects inside said empty space.

Owing to the third aspect of the invention, it is possible to obtain a seal that is associable with a cap of a container that can be formed with a smaller quantity of material than known seals. In fact, the quantity of material is minimised that is necessary for forming parts of the seal that are different from the edge zone that, during use, exerts the seal action. The material that does not work when the seal is engaged with the edge of the container is only the material that forms the appendage, which can be manufactured with a quantity of plastics that is much less than the full central disks or bridge elements of the prior art.

In a fourth aspect of the invention, there is provided an apparatus comprising an extruding device for extruding plastics, a separating device for separating a dose of said plastics from said extruding device, a seal-forming arrangement for forming a seal from said dose in a forming chamber, said seal-forming arrangement having a conduit for conveying said dose from said separating device to said forming chamber, wherein said separating device is supported by said seal-forming arrangement.

Owing to this aspect of the invention, it is possible to obtain an apparatus for forming seals having a particularly simple structure. By using a separating device supported by the seal-forming arrangement it is in fact possible to avoid the carousels that, in the prior art, are dedicated exclusively to supporting and moving the separating device.

Further, the separating device separates a dose of plastics having a mass corresponding to the mass of the seal that it is desired to form. This dose, immediately after being separated from the separating device, is conveyed to the forming chamber through the conduit, along a relatively short path. This enables heating devices to be avoided for heating the doses whilst they are conveyed to the forming chamber and are compacted to form a continuous cylinder.

Lastly, the apparatus according to the fourth aspect of the invention enables seals of an annular shape to be obtained that require a reduced consumption of plastics.

In a fifth aspect of the invention, an apparatus is provided comprising a dispensing device for dispensing plastics to a supporting surface, a movement arrangement for mutually moving said dispensing device and said supporting surface such that the plastics dispensed by said dispensing device form a precursor of an annular object on said supporting surface, wherein it further comprises a forming arrangement for shaping said precursor on said supporting surface so as to obtain said annular object.

In a sixth aspect of the invention, a method is provided comprising the steps of:
dispensing plastics to a supporting surface by dispensing device;
mutually moving said dispensing device and said supporting surface such that the plastics dispensed by said dispensing device form a precursor of an annular object on said supporting surface,
wherein it further comprises the step of shaping said precursor on said supporting surface so as to obtain said annular object.

Owing to the fifth and to the sixth aspect of the invention, it is possible to obtain annular objects, for example seals, having a very precise shape. In fact, the forming arrangement enables the precursor of the annular object to be shaped according to the desired geometry.

The dispensing device further enables the quantity of plastics to be dosed with precision and many plastics that are different from one another to be processed.

The dispensing means further enables the quantity of plastics to be dosed with precision and many plastics that are different from one another to be processed.

In a seventh aspect of the invention a method according to the first claim is provided.

In an eighth aspect of the invention an apparatus according to claim fourteen is provided.

In a ninth aspect of the invention an apparatus according to claim twenty-five is provided.

The invention can be better understood and implemented with reference to the attached drawings, that illustrate some embodiments thereof by way of non-limiting example, in which:

FIG. 37 is a top plan view of a further embodiment of an extruding device having a different form of extruding outlets from the examples in FIGS. 20, 26 and 27.

FIG. 1 shows an apparatus 1 for moulding objects made of plastics. In particular, the apparatus 1 enables seals to be moulded inside caps for containers, for example for bottles or for jars.

Figure 1:
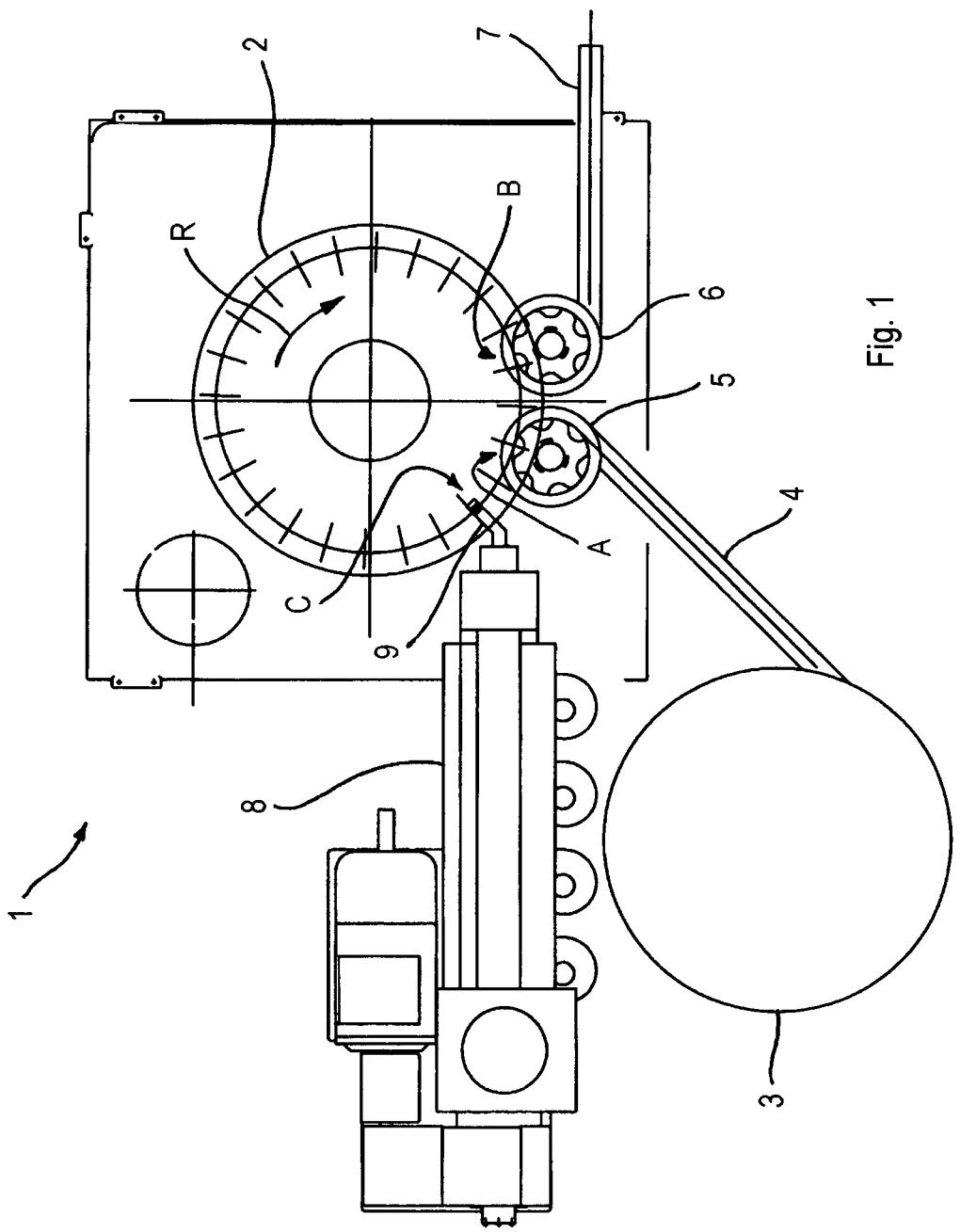
FIG. 1 is a schematic plan view of an apparatus for forming objects from plastics, particularly seals for containers.

The caps processed by the apparatus in FIG. 1 can be made of plastics, for example by compression-moulding or injection moulding. Alternatively, the apparatus 1 can process caps made of metal, for example crown caps or twist-off lids intended for closing jars.

The objects, and in particular the seals, produced by the apparatus 1 can be made from plastics selected from a group comprising: polyethylene copolymers (LLDPE, LDPE, Metocene), styrene block copolymers, in particular having a two-block structure, a three-block structure or ramified structure (for example S-B-S, S-I-S, S-EB-S), polypropylene and EPDM mixtures, polypropylene and EPR mixtures, dynamic vulcanised polypropylene and EPDM products, dynamic vulcanised polypropylene and butyl rubber products, dynamic vulcanised polypropylene and natural rubber products, dynamic vulcanised polypropylene and nitrile rubber products.

The apparatus 1 comprises a moulding carousel 2 supporting, in a peripheral region thereof, a plurality of moulding units that will be disclosed in detail below. Each moulding unit enables a seal to be formed inside a corresponding cap. The moulding carousel 2 is rotatable around an axis, for example vertical, in a rotation direction R.

A supplying and orientating device 3 enables a plurality of caps inside which the seals have to be moulded to be supplied in sequence to the moulding carousel 2. The caps that exit the supplying and orientating device 3 are all orientated in the same manner. The supplying and orientating device 3 is connected, by an inlet conveyor 4, to a supply wheel 5 arranged for transferring in sequence each cap to the corresponding moulding unit of the moulding carousel 2. The supply wheel 5 can be of the star type. The supply wheel 5 delivers each cap to the corresponding moulding units in a delivery position A arranged along the circular path of the moulding unit.

The apparatus 1 comprises an extracting wheel 6, which may be of the star type, to remove from each moulding unit a cap inside which a seal has been formed. The caps having the seals are subsequently removed from the extracting wheel 6 by means of an outlet conveyor 7. The extracting wheel 6 removes the caps having the seals in an unloading position B arranged along the path of the moulding units. The unloading position B is arranged downstream of the delivery position A with respect to the rotation direction R.

The apparatus 1 further comprises an extruder 8 having an extruding nozzle 9 for dispensing plastics in a pasty state intended for forming the seal. The extruding nozzle 9 is arranged in an extruding position C immediately downstream of the delivery position A.

Figure 2:
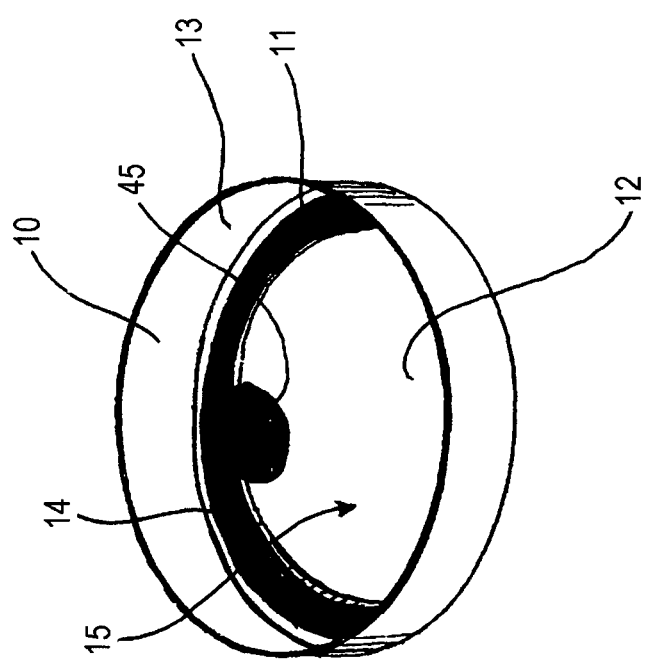
FIG. 2 is a schematic perspective view of a cap having a seal formed by the apparatus in FIG. 1.

FIG. 2 shows a cap 10 having a seal 11 that can be formed by the apparatus 1. The cap 10 comprises an end wall 12, which can be substantially flat, having a circular plan shape. From the end wall 12 a side wall 13 projects, which may be cylindrical in shape. An internal surface of the side wall 13 is provided with a fixing arrangement that is not shown that enables the cap 10 to be fixed in a removable manner to a neck of a container. The fixing arrangement can comprise a thread or one or more ridges.

The seal 11 is fixed to the end wall 12, the seal 11 comprises an edge zone 14 suitable for engaging with an edge of the neck of the container to close the container in a substantially hermetic manner. The edge zone 14 has an annular shape and is in particular shaped like a circular ring. In the seal 11, the edge zone 14 surrounds an empty space 15. In other words, there is no material of the seal 11 inside the edge zone 14.

The seal 11 comprises an appendage 45 that projects inside the empty space 15 from the edge zone 14. In other words, the appendage 45 protrudes inside the edge zone 14. The appendage 45 can have the shape, if seen in a plan view, of a circle portion. It is nevertheless possible to adopt also different shapes from the circle portion for the appendage 45.

The reasons for which the appendage 45 is present will be explained below with reference to FIGS. 3 to 8.

Figure 3:
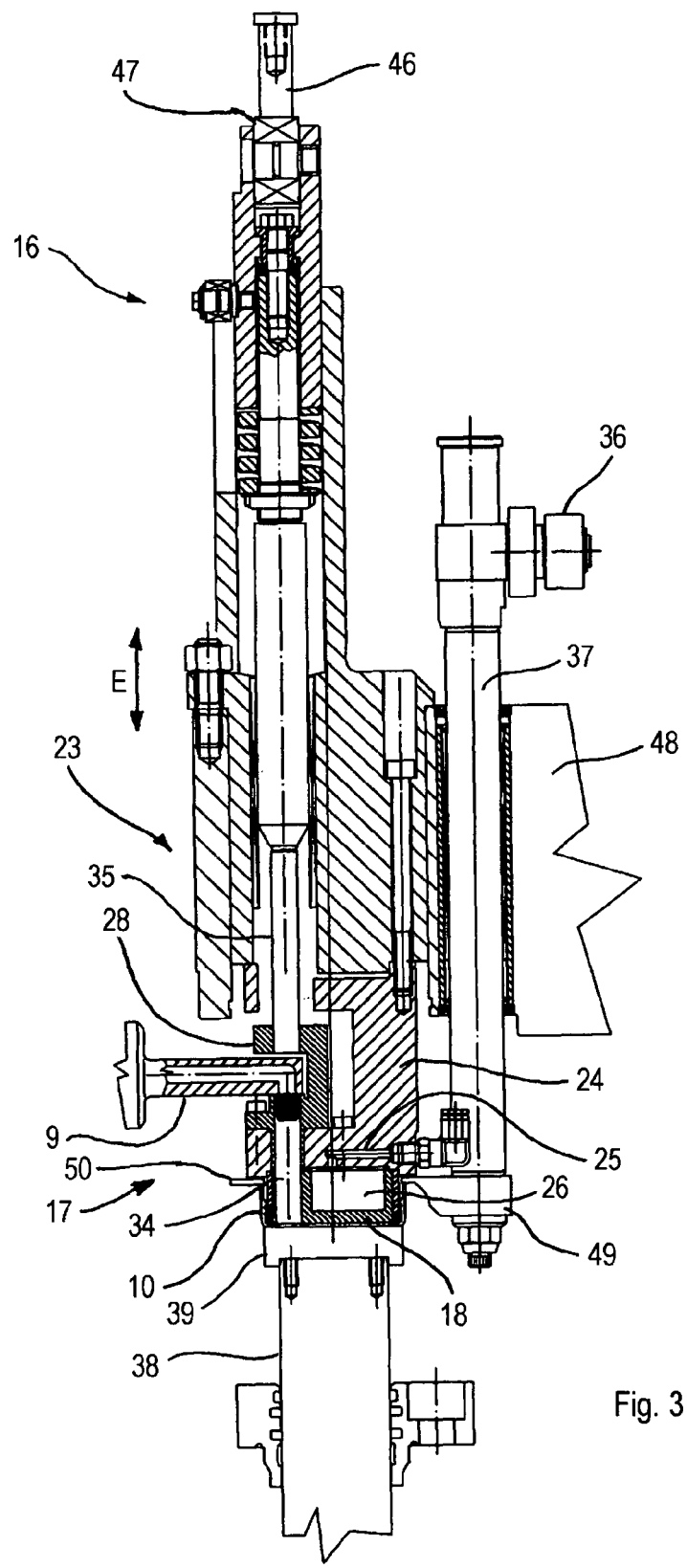
FIG. 3 is a section view of a forming arrangement included in the apparatus in FIG. 1, in a first operating position.
Figure 4:
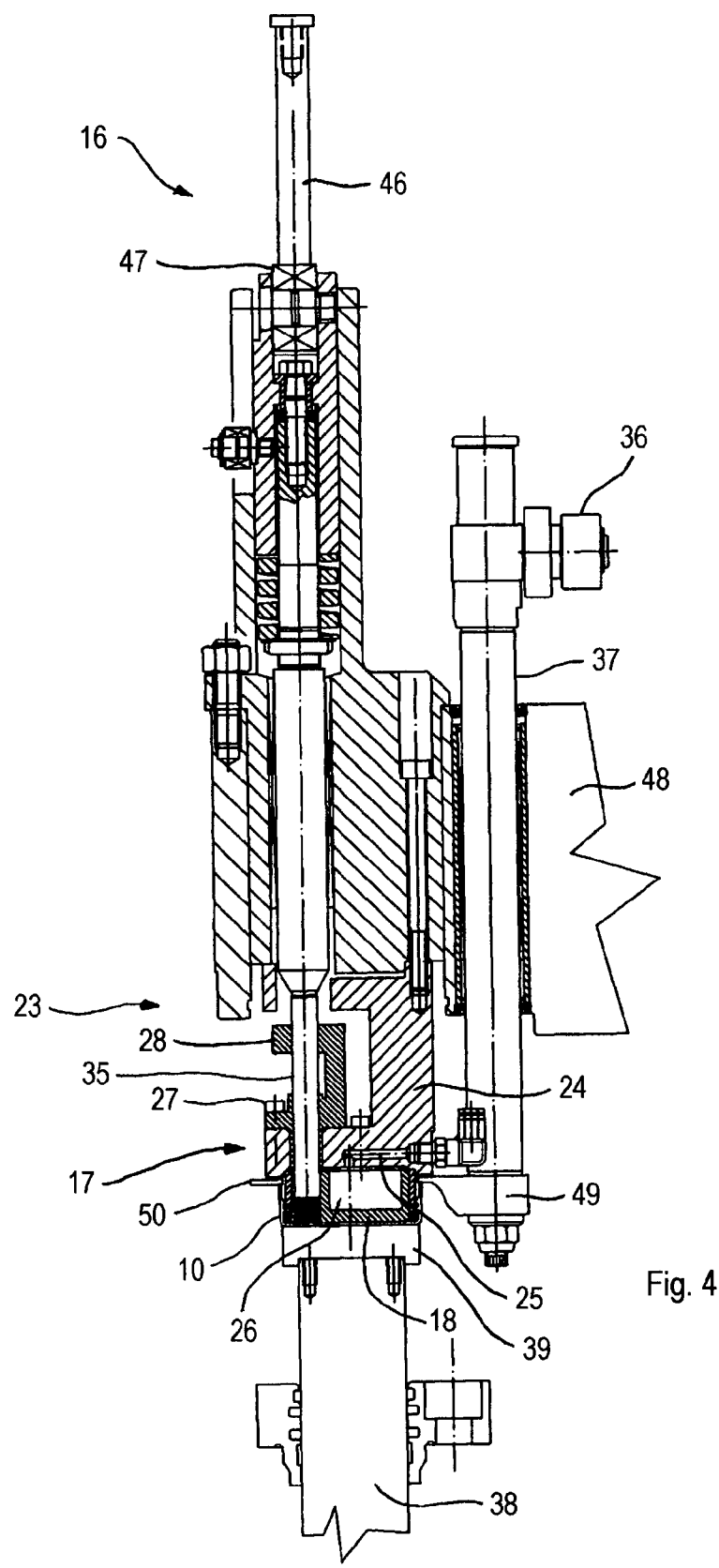
FIG. 4 is a section view like that in FIG. 3, showing the forming arrangement in a second operating position.
Figure 5:
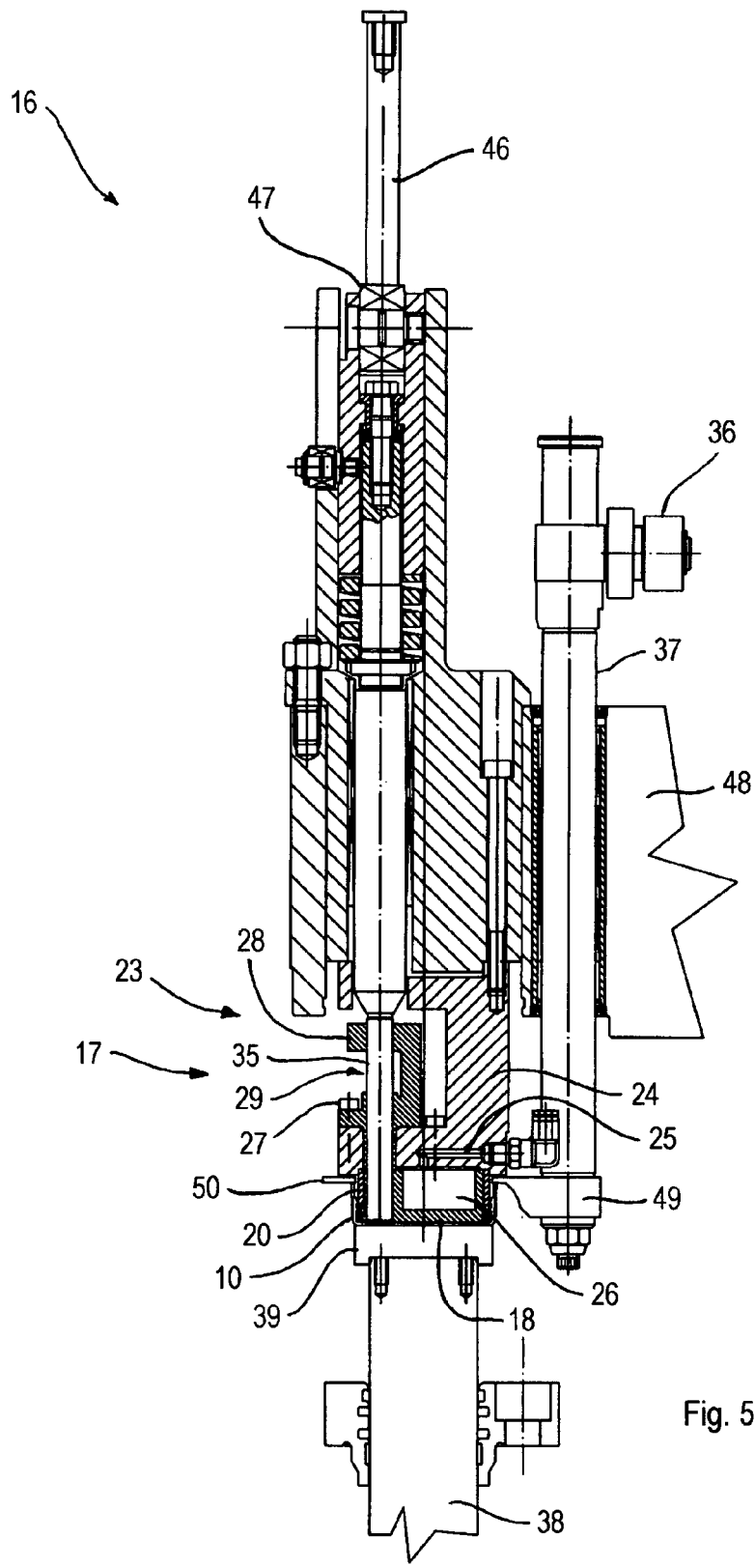
FIG. 5 is a section view like that in FIG. 3, showing the forming arrangement in a third operating position.

FIGS. 3 to 5 show a forming arrangement 16 for forming a seal 11 inside a cap 10. The forming arrangement 16 of the type shown in FIGS. 3 to 5 can be included in each moulding unit mounted on the moulding carousel 2 of the apparatus 1.

Figure 6:
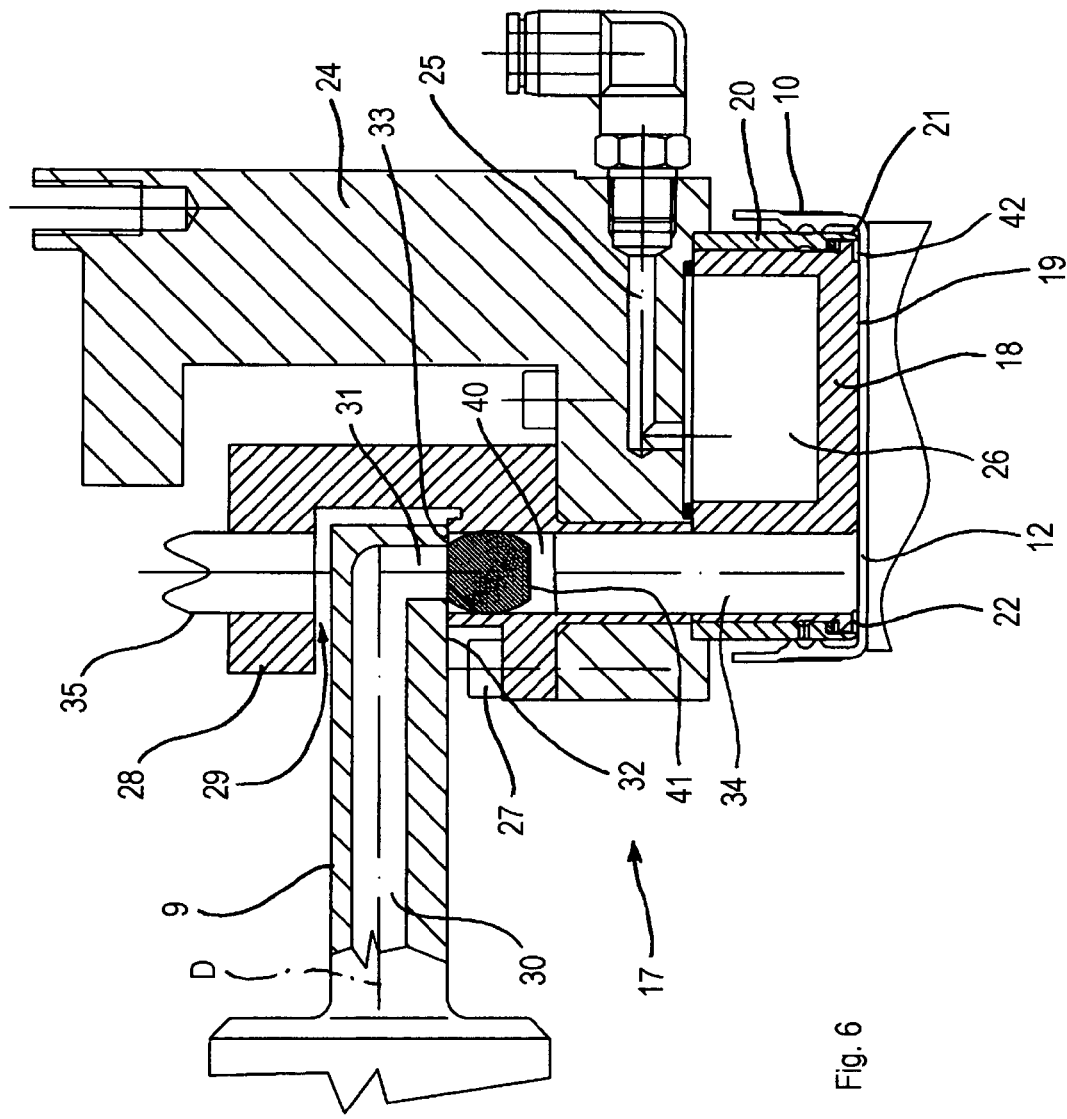
FIG. 6 is an enlarged section view showing a detail of the forming arrangement in the first operating position in FIG. 3.

The forming arrangement 16 comprises a punch member 17 suitable for penetrating inside a cap 10 to shape the plastics such as to shape the seal 11. As shown in FIG. 6, the punch member 17 comprises a central element 18, having a front surface 19 that can contact the end wall 12 of the cap 10. A sleeve 20 surrounds the central element 18.

In the illustrated embodiment, the sleeve 20 and the central element 18 are fixed to one another. Nevertheless, the sleeve 20 can also be movable with respect to the central element 18. In this case, a spring can be provided for acting on the sleeve 20.

The sleeve 20 has an annular end 21 suitable for coming to abut on the end wall 12 of the cap 10.

On the punch member 17 there is obtained a recess 22, defined between the central element 18 and the annular end 21 of the sleeve 20. The recess 22 may have the shape of an annular, for example circular, groove corresponding to the shape of the edge zone 14 of the seal 11. The recess 22 surrounds the front surface 19, which can thus be considered to be an internal region of the forming arrangement 16.

The central element 18 and the sleeve 20 are fixed to a supporting arrangement 23, which comprise a supporting element 24 in which a cooling circuit 25 can be obtained, through which a cooling liquid passes coming from a pipe that is not shown. A chamber 26 is obtained in the central element 18 and receives the liquid of the cooling circuit 25 so as to keep the temperature of the regions of the central element 18 and of the sleeve 20 that form the seal 11 low.

On the supporting element 24 there is mounted, for example by screws 27, a separating device comprising a separating member 28 for separating doses of plastics from the extruding nozzle 9. The separating member 28 has a seat 29 the height of which is such as to receive an end portion of the extruding nozzle 9.

Inside the extruding nozzle 9 there is obtained an extruding conduit having a first portion 30 that extends along an axis D. In the example shown, the axis D is substantially horizontal. A second portion 31 of the extruding conduit is arranged downstream of the first portion 30 and is transverse, for example perpendicular, to the first portion 30. In the example shown, the second portion 31 is substantially vertical. The second portion 31 leads onto an outlet surface 32 that, in the example shown, is substantially horizontal.

The seat 29 is bounded, in a lower region thereof, by a separating surface 33 suitable for interacting with the outlet surface 32 to remove therefrom a dose of plastics. In the example shown, the separating surface 33 is substantially flat and is arranged horizontally.

Inside the punch member 17 a conduit 34 is obtained, the conduit 34 being defined by a through hole that passes through the supporting element 24 and the central element 18. The conduit 34 may have a circular cross section. The conduit 34 has an end leading onto the front surface 19, i.e. in the central region of the forming arrangement 16. This end leads into a position that is contiguous with the recess 22. At a further end of the conduit 34 there is a channel 40, open on a side, that is obtained in a lower region of the separating member 28. The channel 40 leads into the separating surface 33. In the example shown, the conduit 34 is rectilinear and substantially vertical.

The forming arrangement 16 comprises a piston 35 that is movable along a direction E parallel to a longitudinal axis along which the punch member 17 extends. The piston 35 can move between a retracted position shown in FIG. 3 and an extended or forming position shown in FIG. 5. In the retracted position, the piston 35 is not present inside the conduit 34, or in the seat 29. In the extended position, the piston 35 passes through the conduit 34 until it reaches near the front surface 19. The piston 35 is moved along the direction E by a driving device comprising a cam member 46 that engages with a wheel 47 associated with the piston 35.

The punch member 17 is fixed to a supporting body 48 of the moulding carousel 2.

Each moulding unit further comprises an extracting element 49, having a side projection 50, which can be substantially flat, suitable for engaging with an edge of the side wall 13 of the cap 10, in order to separate the cap 10 from the punch member 17, after the seal 11 has been formed.

The extractor 49 is fixed to a first end of a rod 37. At a second end of the rod 37, opposite the first end, there is mounted a roller 36 that engages with a cam that is not shown. This cam enables the extractor 49 to be moved parallel to the direction E to remove the cap 10 from the punch member 17.

In an alternative embodiment, the extractor 49 can be moved by a movement device that is different from the cam and from the roller 36, for example comprising an elastic member such as a spring.

There is also provided a stem 38, having an upper end that supports a supporting element 39 on which a cap 10 can be rested. The supporting element 39 supports the cap 10 and pushes the cap with force to the punch member 17 whilst the seal 11 is formed inside the cap 10.

The stem 38 is included in an actuator, for example of hydraulic type, arranged for moving the supporting element 39 parallel to the direction E, so as to move the cap 10 towards the punch member 17 or move the cap 10 away from the punch member 17.

During operation, the supporting element 39 is initially at a certain distance from the punch member 17. In the delivery position A, the supply wheel 5 conveys a cap 10 to the corresponding moulding unit and deposits the cap 10 on the supporting element 39 of the moulding unit.

The stem 38 rises, moving parallel to the direction E, i.e. vertically, and moves the cap 10 towards the punch member 17. In this manner, the punch member 17 penetrates inside the cap 10, until the end wall 12 comes to abut against the front surface 19.

In this position, as shown in FIG. 6, between the punch member 17 and the end wall 12 of the cap 10 an annular forming chamber 42, is defined in which the edge zone 14 of the seal 11 will be formed. In particular, the annular forming chamber 42 is defined inside the recess 22, closed by the end wall 12. The annular forming chamber 42 is in communication with the conduit 34, which leads into a position adjacent to the recess 22. In other words, the conduit 34 is directly in communication with the recess 22, without connecting portions having to be interposed between the conduit 34 and the recess 22.

When the moulding carousel 2 takes the corresponding moulding unit to the extruding position C, the end portion of the extruding nozzle 9 is housed inside the seat 29. The separating surface 33 comes into contact with the outlet surface 32 of the extruding nozzle 9. The separating surface 33 scrapes from the outlet surface 32 a dose 41 of plastics, corresponding to the quantity of plastics that exits the extruding nozzle 9 in the period that elapses between the passage of the separating members 28 of two successive moulding units at the extruding position C. The dose 41 is received inside the channel 40 that, as already disclosed previously, is open on one side. This situation is shown in FIGS. 3 and 6.

Subsequently, owing to the rotation of the moulding carousel 2, the forming arrangement 16 moves away from the extruder 8. The seat 29 of the separating member 28 disengages from the extruding nozzle 9.

The cam member 46 drives the piston 35 such that the latter moves to the extended position. The piston 35 thus penetrates the seat 29 and, subsequently, inside the channel 40 and then the conduit 34. In this manner, the piston 35 pushes the dose 41 contained in the channel 40 inside the conduit 34, such that the dose 41 moves towards the end wall 12 of the cap 10. In the position shown in FIGS. 4 and 7, the dose 41 is in contact with the end wall 12.

From this moment forth, as the piston 35 penetrates further into the conduit 34, the dose 41 is compressed and, from the conduit 34, passes into the adjacent annular forming chamber 42. The annular forming chamber 42 is thus gradually filled by the plastics pushed by the piston 35. In this manner the edge zone 14 of the seal 11 is formed.

Figure 8:
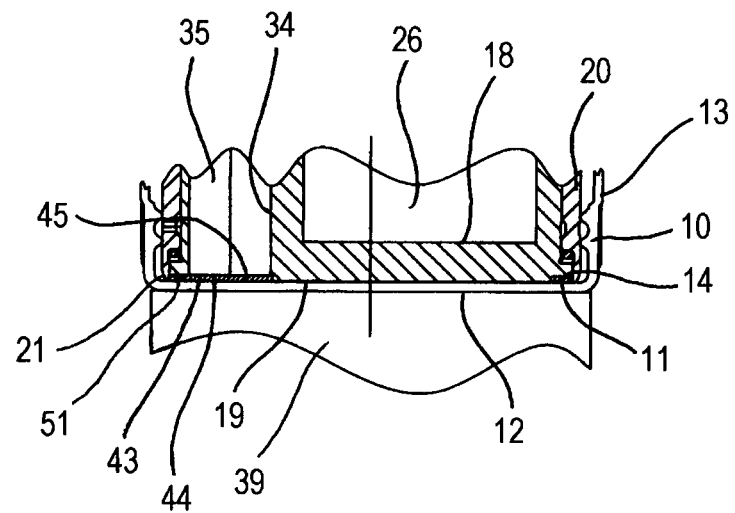
FIG. 8 is a view like that in FIG. 7, showing a detail of the forming arrangement in the third operating position in FIG. 5.

As shown in FIGS. 5 and 8, the piston 35 stops inside the conduit 34, in the extended position, when a thrusting surface 43 of the piston 35, which bounds the piston 35 transversely to the direction E, is near a transverse surface 51 that bounds the recess 22 transversely to the direction E.

In particular, in the extended position the thrusting surface 43 of the piston 35 can be flush with the transverse surface 51 of the recess 22, even if this is not a necessary condition, as will be disclosed better below.

In the extended position, between the piston 35 and the side wall 12 there is defined an internal forming chamber 44 that, if viewed in a plan view, is arranged inside the annular forming chamber 42. The internal forming chamber 44 is contiguous with the annular forming chamber 42. When the piston 35 stops in the extended position, inside the internal forming chamber 44 a certain quantity of plastics remain that form the appendage 45 of the seal 11.

In conclusion, the plastics flow from the internal forming chamber 44 to the annular forming chamber 42 moving in a direction that goes from the centre to the periphery, in particular in a centrifugal direction.

The internal forming chamber 44 and the piston 35 that bounds the internal forming chamber 44 act as a compensating element for compensating possible weight variations of the dose 41. If, in fact, the dose 41 has a mass that is slightly greater than a theoretical value, the piston 35 stops in an extended position such as to form an appendage 45 having a greater thickness, for example greater than the thickness of the edge zone 14. If on the other hand the dose 41 has a lesser mass than the theoretical value, the piston 35 forms an appendage 45 having a reduced thickness, for example less than the thickness of the edge zone 14. In other words, possible variations of the mass of the dose 41 are translated into variations in the thickness of the appendage 45. As the appendage 45 does not participate in the sealing action exerted by the edge zone 14 during use, possible variations in the thickness of the appendage 45 do not influence the correct operation of the seal 11.

The punch member 17 and the cap 10 remain in the position shown in FIGS. 5 and 8 for a sufficient time for the plastics constituting the seal 11 to stabilise. Subsequently, the stem 38 moves the supporting element 39 downwards, whilst the slide projection 50 of the extracting element 49 acts on the upper edge of the cap 10 to remove the cap 10 from the punch member 17. The cap 10 is subsequently moved away from the moulding carousel 2 owing to the extracting wheel 6.

The supporting element 39 is now ready for receiving a new cap, so that a new forming cycle can be initiated.

The forming arrangement 16 enables seals with reduced consumption of plastics to be obtained. In fact, the appendage 45 is made with a limited quantity of plastics. The quantity of plastics is thus minimised, which, during use of the seal, is not engaged with the neck of the container and therefore has not utility.

Figure 9:
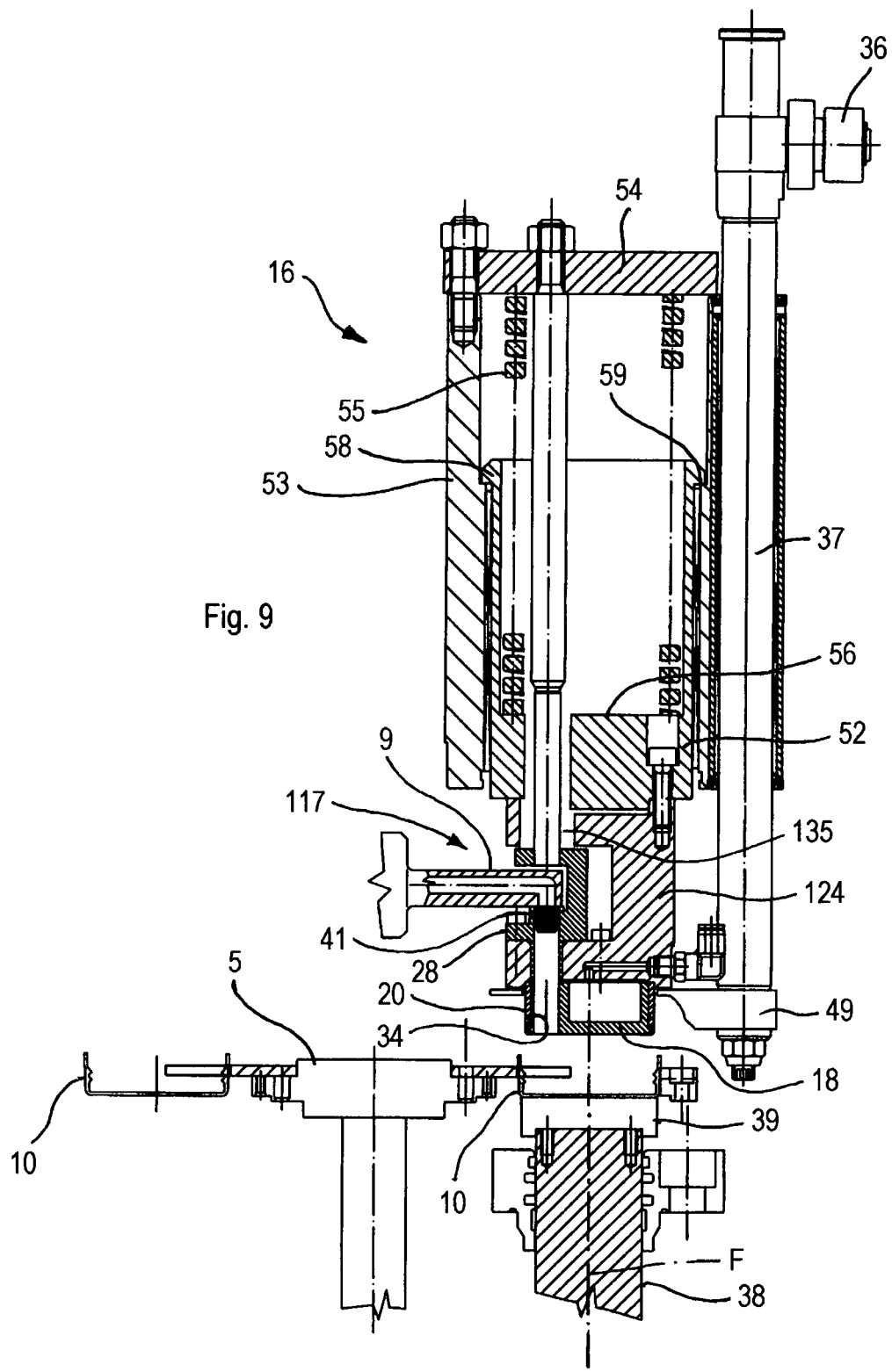
FIG. 9 is a section view showing a forming arrangement according to an alternative embodiment, in an initial operating position.
Figure 10:
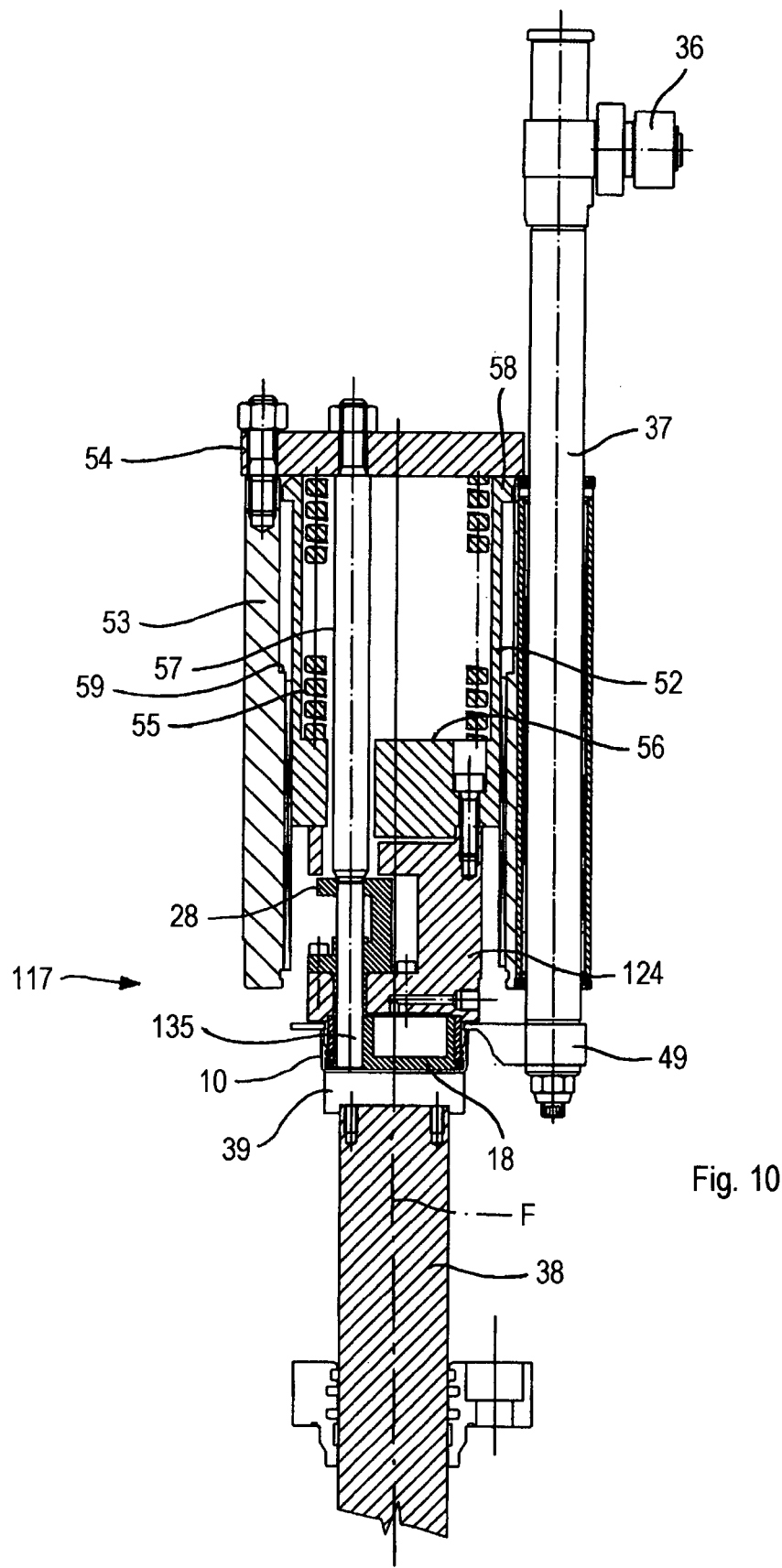
FIG. 10 is a view like that in FIG. 9, showing the forming arrangement in a final operating position.

FIGS. 9 and 10 show an alternative embodiment in which the parts common to the preceding embodiment will be indicated by the same reference numbers as those used in FIGS. 3 to and will not be disclosed again in detail. In the embodiment in FIGS. 9 and 10, each moulding unit comprises a punch member 117 that is moved by the stem 38 that supports the supporting element 39. For this purpose, the punch member 117 comprises a supporting element 124 fixed to a cup body 52 that is movable inside a housing element 53. The housing element 53 is in turn fixed to a plate 54 arranged in a fixed position on the moulding carousel 2.

Inside the cup body 52 an elastic member is arranged, which may comprise a spring 55, for example a coil spring. The spring 55 has a first end in contact with the plate 54 and a second end in contact with an abutting surface 56 of the cup body 52. The spring 55 is mounted in such a manner as to push the punch member 117 to the stem 38.

On the plate 54 a bar 57 is further fixed, shown in FIG. 10, at a lower end of which a piston 135 is obtained, having a function that is similar to the piston 35 disclosed with reference to FIGS. 3 to 8. The bar 57 is integral with the piston 135. The piston 135 is thus fixed to the moulding carousel 2.

The stem 38, as already disclosed with reference to FIGS. 3 to 8, is on the other hand included in an actuator that moves the stem 38 along a longitudinal axis F thereof.

During operation, the stem 38 and the supporting element 39 fixed thereto are initially in a lowered position, shown in FIG. 9, in which the supply wheel 5 takes a cap 10 to the supporting element 39.

The cup body 52 is pushed to the punch member 117 by the spring 55 and is in an advanced configuration in which a flanged edge 58 of the cup body 52 abuts against a step 59 obtained inside the housing element 53.

Owing to the rotation of the moulding carousel 2, the separating member 28 reaches the extruding nozzle 9 and separates the dose 41, which is received inside the open channel obtained in the separating member 28.

The stem 38 is then gradually lifted by the corresponding actuator and takes the end wall 12 of the cap 10 into contact with the central element 18 and with the sleeve 20. The stem 38 continues to move upwards along the longitudinal axis F and lifts the cap 10 and the punch member 117 engaged with the cap 10. The thrust exerted by the stem 38 enables the force of the spring 55 to be overcome so that the cup body 52 moves inside the housing element 53 and the flanged edge 58 approaches the plate 54. The punch member 117 thus reaches a retracted configuration as shown in FIG. 10. Whilst the punch member 117 rises upwards to reach the retracted configuration, the piston 135, which is fixed to the carousel 2, penetrates first inside the open channel obtained in the separating member 28 and then inside the conduit 34. The dose 41 is thus pushed to the cap 10. The plastics, after coming into contact with the end wall 12 of the cap 10, move from the centre to the periphery and pass from the conduit 34 to the recess 22. The plastics gradually fill all the annular forming chamber 42 and give rise to the seal 11, as previously explained with reference to FIGS. 6 to 8.

The embodiment shown in FIGS. 9 and 10 enables a single actuating device to be used, i.e. the actuator in which the stem 38 is included for moving both the supporting element and the punch member 117, whilst the piston 135 is maintained in a fixed position. In this manner, it is possible to avoid using, in addition to the actuating device that moves the supporting element 39, a further actuating device for moving the piston 135. This simplifies the structure of each moulding unit.

Figure 11:
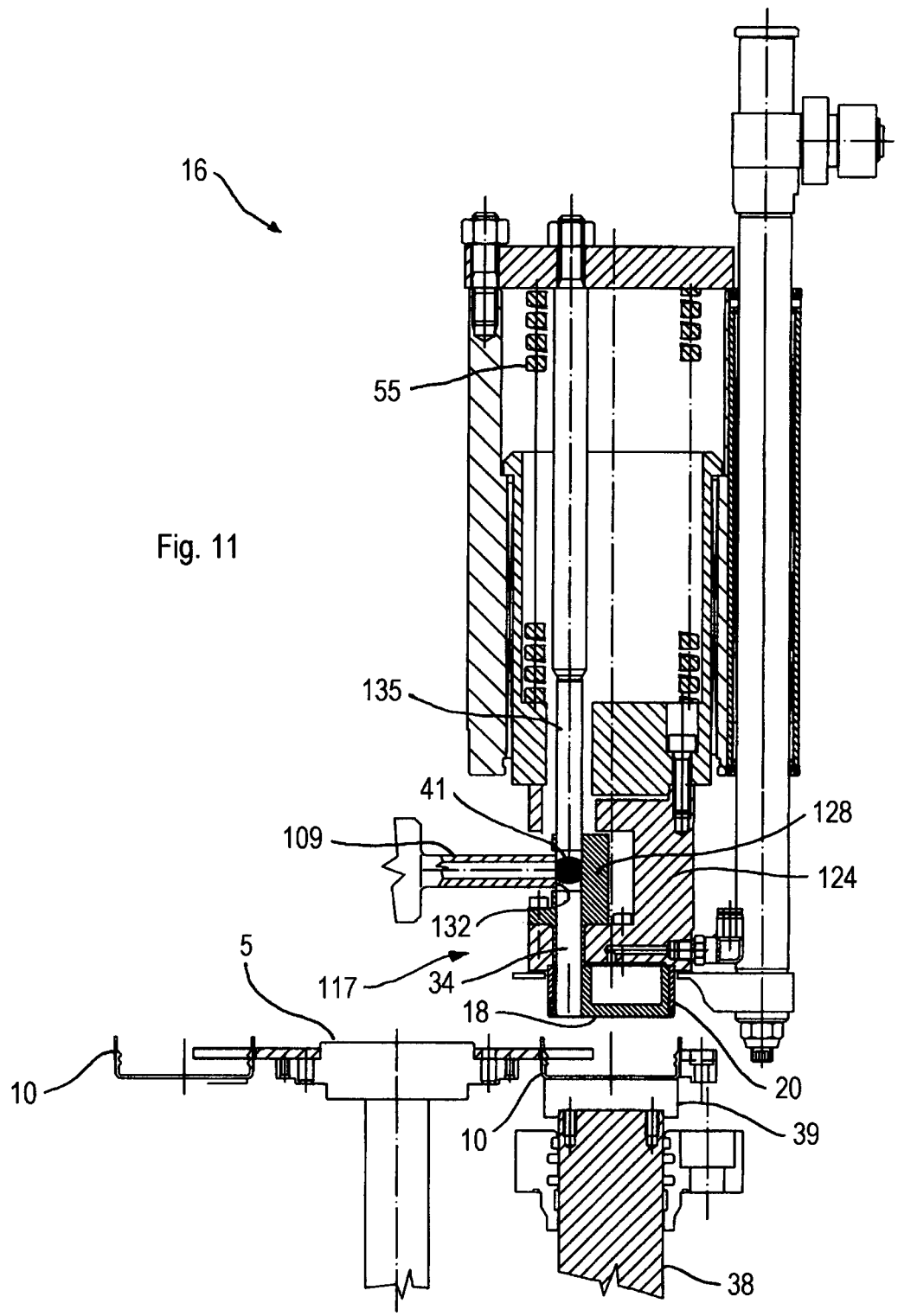
FIG. 11 is a section view showing a forming arrangement according to another alternative embodiment, in an initial operating position.
Figure 12:
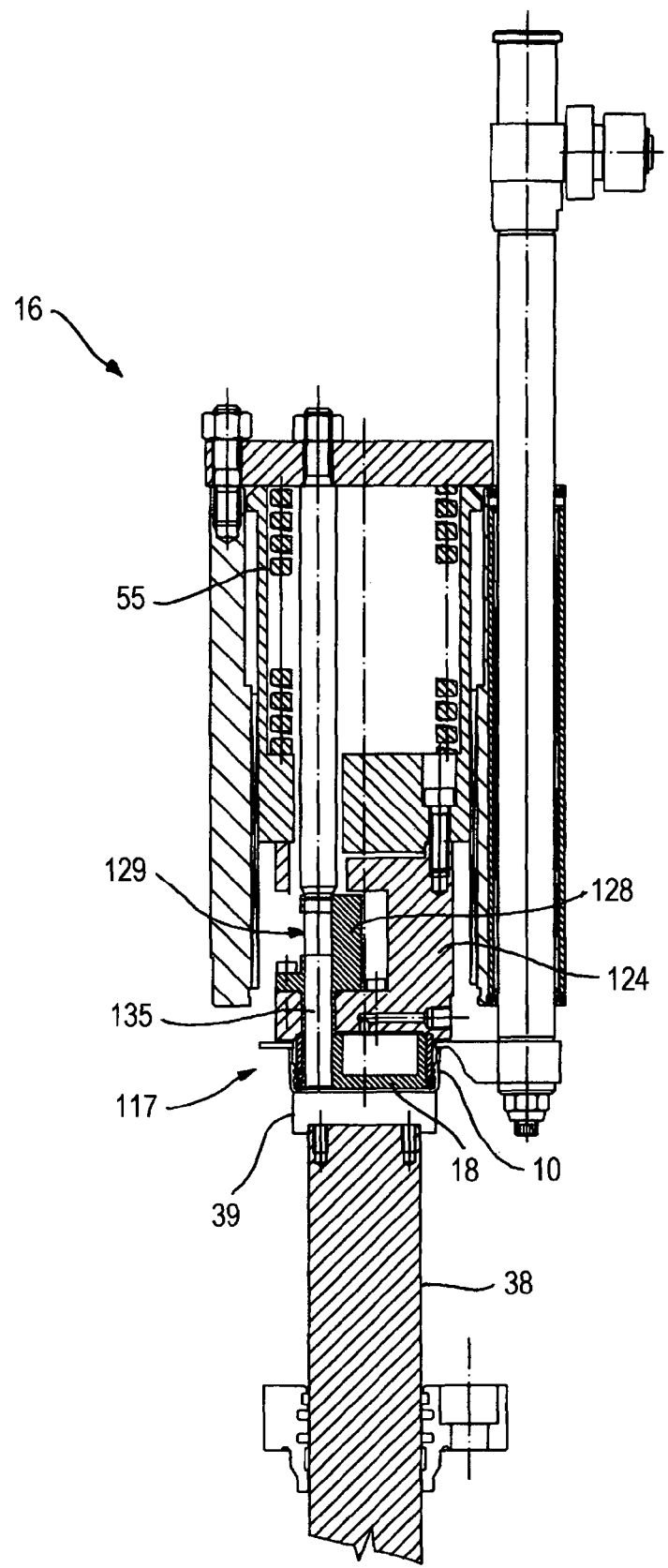
FIG. 12 is a view like that in FIG. 11, showing the forming arrangement in a final operating position.

FIGS. 11 and 12 show another alternative embodiment, which differs from the embodiment shown in FIGS. 9 and 10 through the configuration of the extruding nozzle. In the embodiment in FIGS. 11 and 12 an extruding nozzle 109 is in fact provided inside which an extruding conduit is obtained leading onto an outlet surface 132 that, in the example shown, is substantially vertical.

Figure 13:
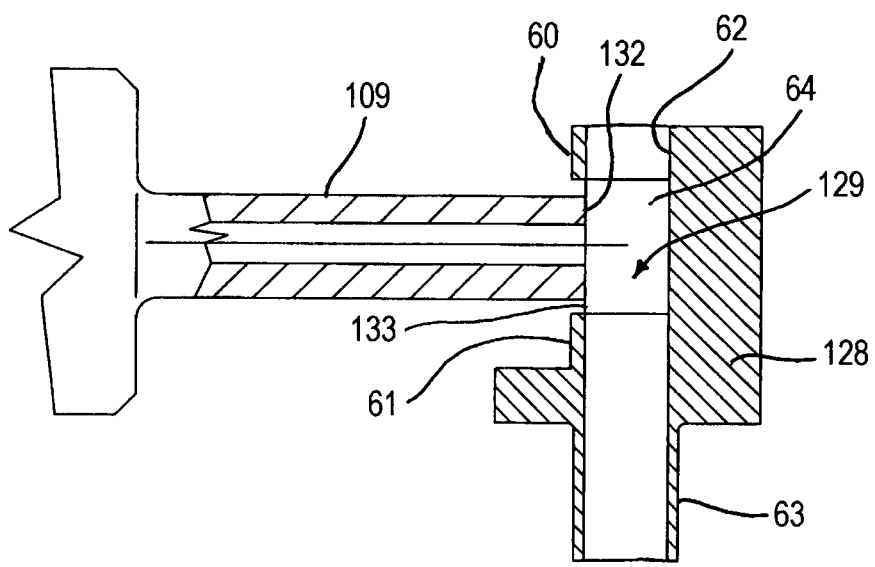
FIG. 13 is an enlarged view showing an extruding nozzle of the embodiment in FIGS. 11 and 12.
Figure 14:
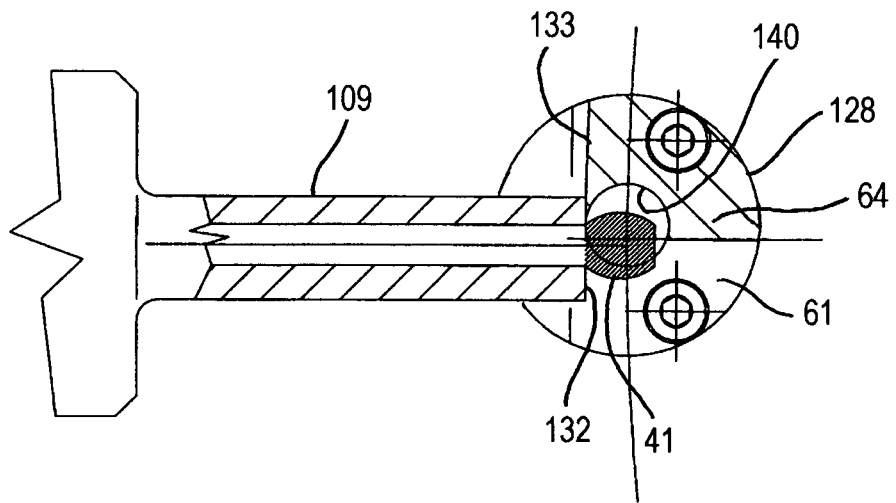
FIG. 14 is a plan view of the extruding nozzle in FIG. 13.

The supporting element 124 supports a separating member 128, shown in detail in FIGS. 13 and 14, having an upper portion 60 and a lower portion 61 between which there is defined a seat 129. In the upper portion 60 a through hole 62 is obtained that can receive the piston 135.

From the lower portion 61 a protruding element 63 projects, for example a protruding element 63 in the shape of a hollow cylinder, suitable for being received inside the supporting element 124. The lower portion 61 and the protruding element 63 are drilled, so as to permit the passage of the piston 135.

The seat 129 is further bounded by a side wall 64, which connects the lower portion 61 to the upper portion 60. In the side wall 64 an open channel 140 is obtained, which in the example shown is substantially vertical, arranged for receiving the dose 41.

The side wall 64 is bounded by a separating surface 133, suitable for interacting with the outlet surface 132 of the extruding nozzle 109 to remove the dose 41 therefrom. In the example shown, the separating surface 133 is substantially vertical.

During operation, the stem 38 is initially in the lowered position in which, as shown in FIG. 11, the supply wheel 5 takes a cap 10 to the supporting element 39.

The punch member 117 is pushed by the spring 55 in the advanced configuration.

When, during rotation of the moulding carousel 2, the separating member 128 arrives at the extruding nozzle 109, the separating surface 133 scrapes a dose 41 of plastics from the outlet surface 132. As shown in FIG. 11, the dose 41 is housed inside the channel 140 and, following rotation of the moulding carousel 2, is moved away from the extruding nozzle 109.

Subsequently, the actuator starts to move the supporting element 39 upwards, together with the cap 10 supported thereby. The end wall 12 of the cap 10 thus comes into contact with the central element 18 and the sleeve 20, after which the punch member 117 is moved upwards by the stem 38, which overcomes the force of the spring 55. The piston 135, on the other hand, remains in a fixed position with respect to the moulding carousel 2.

Figure 7:
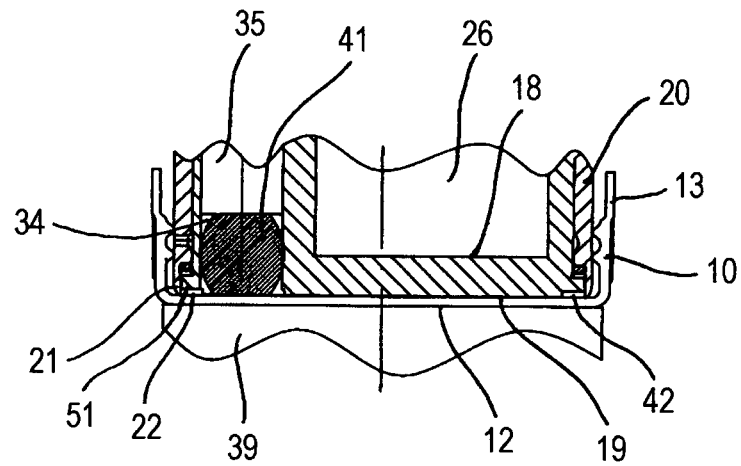
FIG. 7 is an enlarged section view showing a detail of the forming arrangement in the second operating position in FIG. 4.

As the punch member 117 is moved upwards, the piston 135 first penetrates the through hole 62, subsequently the channel 140 and lastly the conduit 34, thus pushing the dose 41 inside the recess 22 for forming the edge zone 14 of the seal 11, as shown in FIG. 12 and as previously disclosed with reference to FIGS. 6 to 8.

Figure 15:
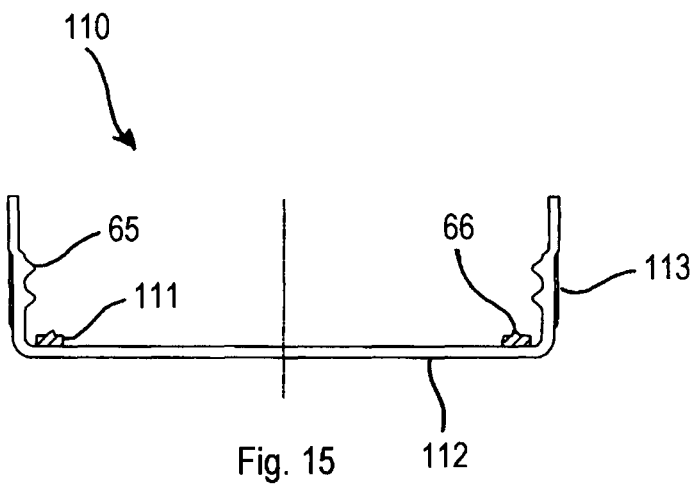
FIG. 15 is a schematic section showing a screw cap having a seal obtained according to the invention.
Figure 16:
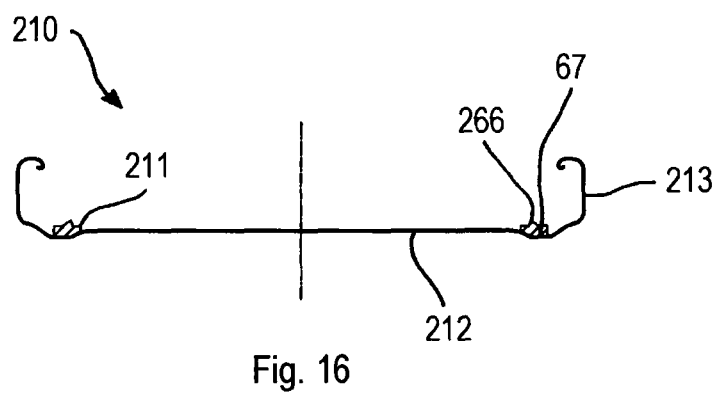
FIG. 16 is a schematic section showing a twist-off lid having a seal obtained according to the invention.
Figure 17:
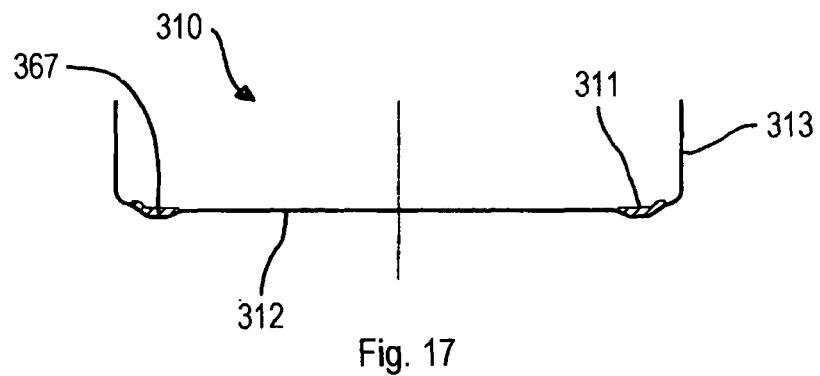
FIG. 17 is a schematic section showing a lid according to an alternative embodiment having a seal obtained according to the invention.

FIGS. 15 to 17 show different types of caps inside which different types of seals can be moulded by using the apparatus 1. In particular, FIG. 15 shows a screw cap 110, which can be obtained by injection or compression-moulding plastics. The screw cap 110 comprises an end wall 112 and a side wall 113 inside which one or more threads 65 are obtained for enabling the screw cap 110 to be removably fixed to the neck of a container. On the end wall 112 there is obtained a seal 111 that may comprise an appendage that is not shown, that is similar to the appendage 45 shown in FIG. 2. The seal 111 comprises a lip 66 arranged for engaging with the neck of the container to exert a sealing action.

In an embodiment that is not shown, the seal 111 could be provided with two lips.

FIG. 16 shows a lid 210, of the so-called twist-off type, usable for closing containers with a wide mouth such as jars. The lid 210 can be made of a metal material and comprises an end wall 212 to which a side wall 213 is adjacent. An edge of the side wall 213 is folded inside the lid 210. The lid 210 is provided with a seal 211, which may comprise an appendage that is not shown that is similar to the appendage 45. In the example shown, the seal 211 is provided with a lip 266, but two lips could also be present. The seal 211 is housed inside a throat 67 included in the end wall 212.

FIG. 17 shows a cap 310, of the so-called twist-off type, having a side wall 313 provided with an edge that, unlike the cap in FIG. 16, is not folded inside the cap 310 but is substantially straight. In a throat 367 obtained in an end wall 312 of the cap 310 a seal 311 is housed, having a substantially flat central zone surrounded by a peripheral annular ridge, possibly comprising an appendage that is similar to the appendage 45.

Whilst in FIGS. 3 to 12 the punch member inside which the piston is arranged is always positioned above the cap 10, it is also possible for the punch member to be arranged below the cap inside which the seal has to be formed.

Further, instead of forming the seals 11 directly inside the caps 10, it is possible to form the seals 11 on an abutting surface of the apparatus 1 and subsequently associate, for example by gluing, each seal with a corresponding cap.

Also, the recess 22 and the internal forming chamber 44, rather than being obtained on the punch member, can be made in the end wall 12 of the cap 10. In this case the punch member has a substantially flat forming surface.

In an embodiment that is not shown, the conduit 34, instead of leading onto the front surface 19, can lead directly into the recess 22, in which case seals devoid of the appendage 45 will be obtained.

The forming arrangement 16, rather than being mounted on a carousel, can be arranged in a different manner, for example along the path of a closed-loop conveyor belt.

The forming arrangement 16 can further be used for forming objects other than the seals, for example objects with an annular shape or objects having a central hole or more in general entirely hollow objects.

Figure 18:
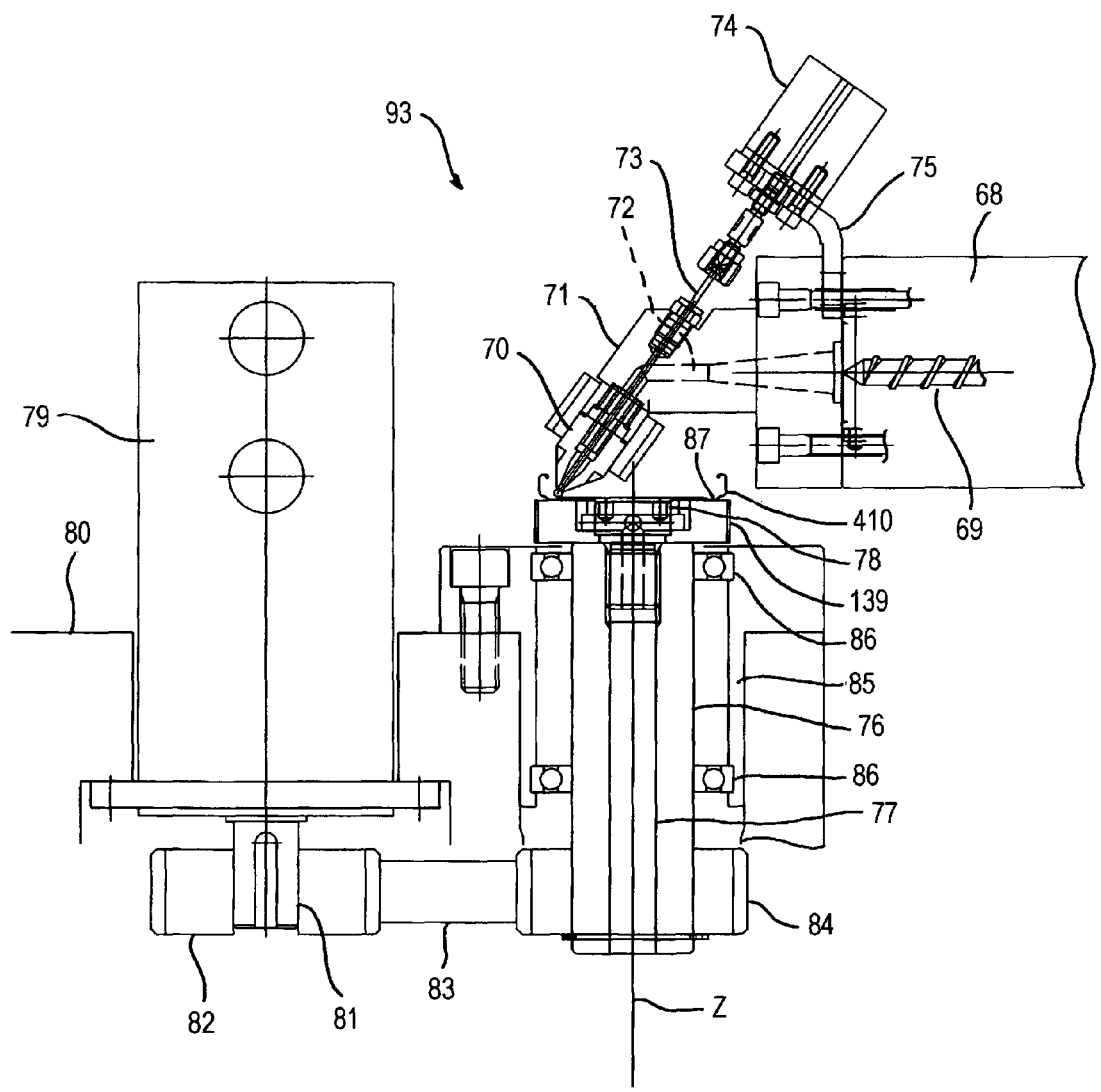
FIG. 18 is a schematic view of an apparatus for dispensing precursors of annular objects.
Figure 19:
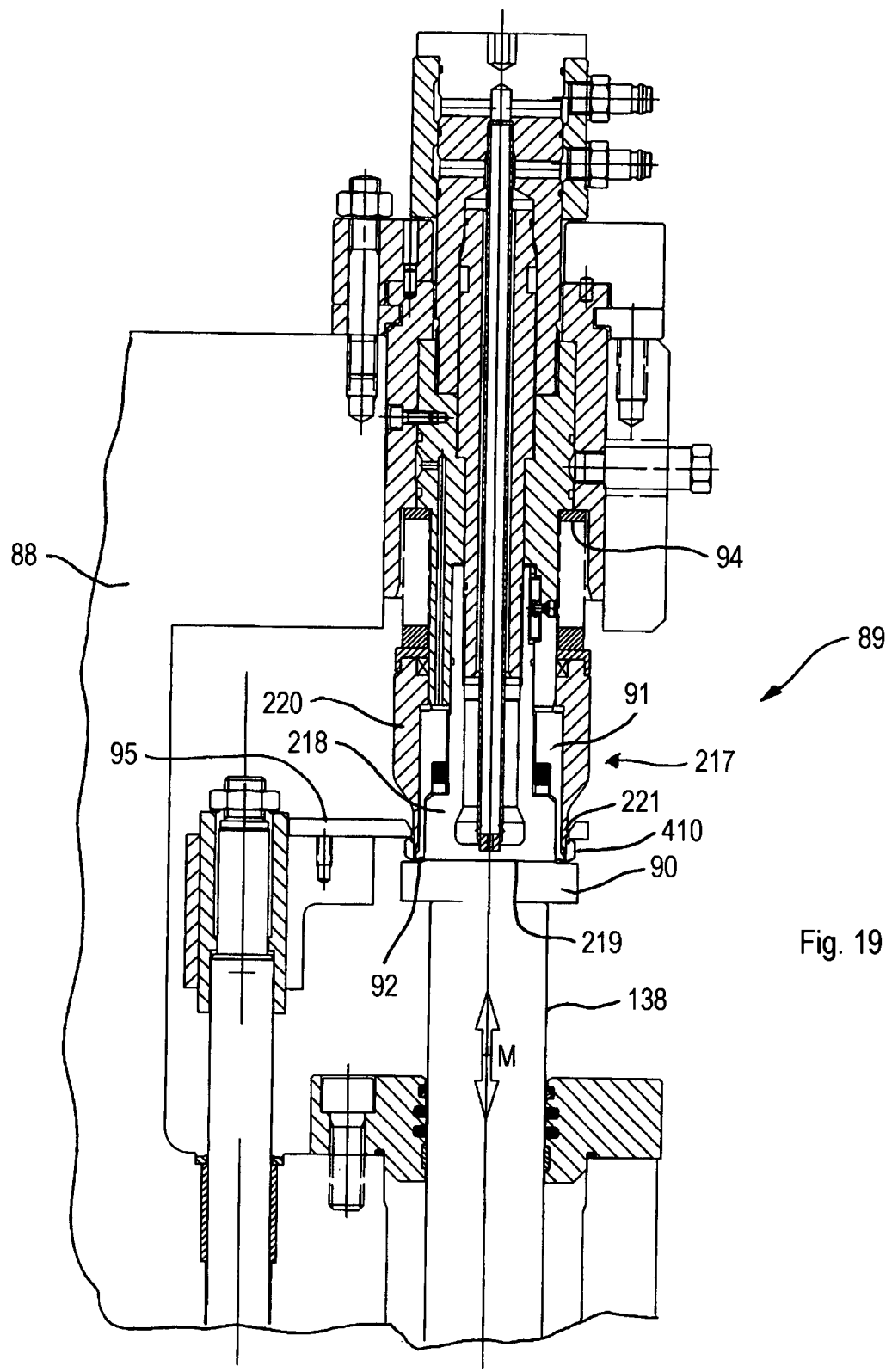
FIG. 19 is a schematic view of a forming arrangement for shaping the precursors in FIG. 18.
Figure 20:
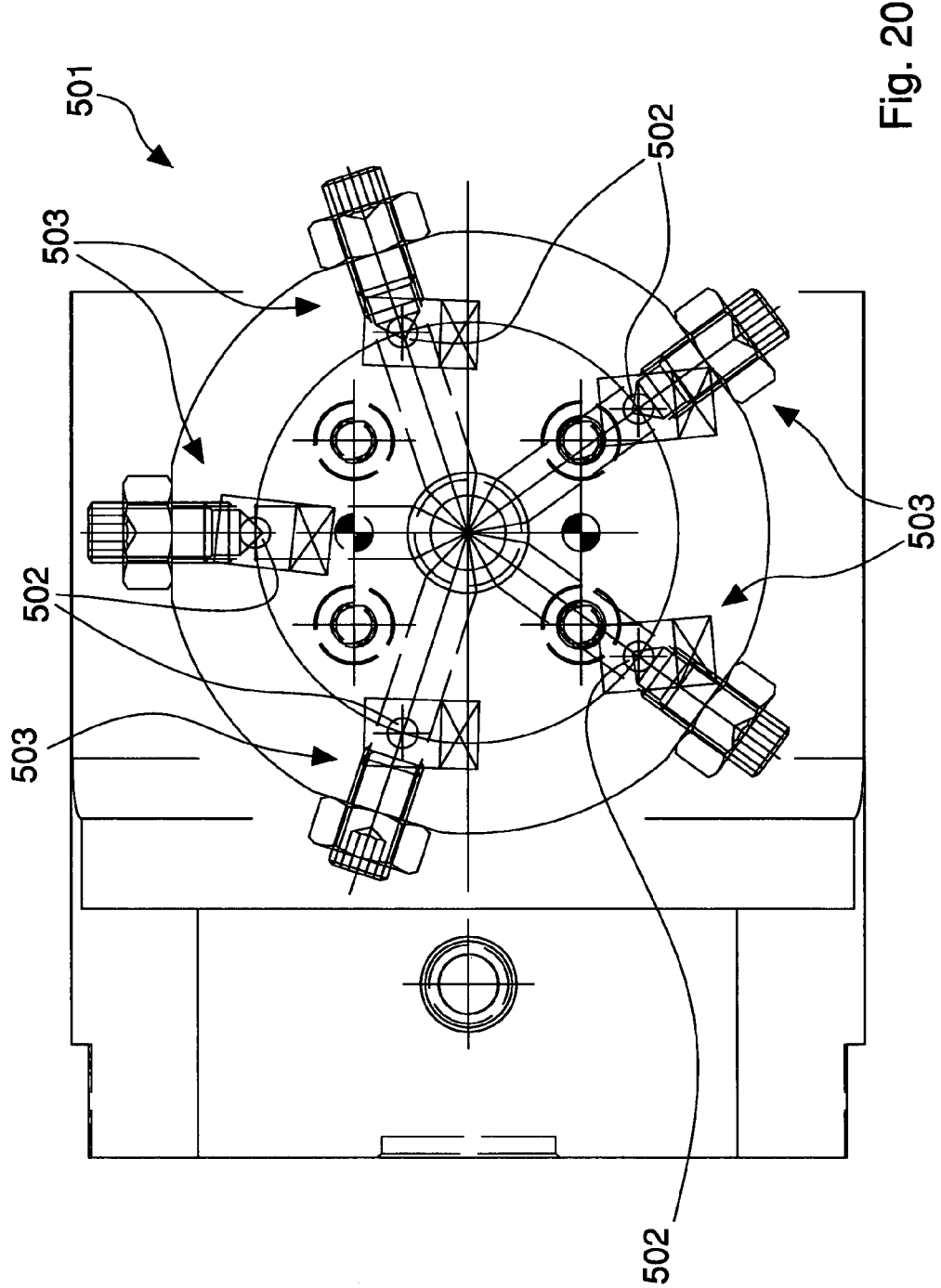
FIG. 20 is a top plan view of an extruding device for plastics provided with plurality of extruding outlets.
Figure 21:
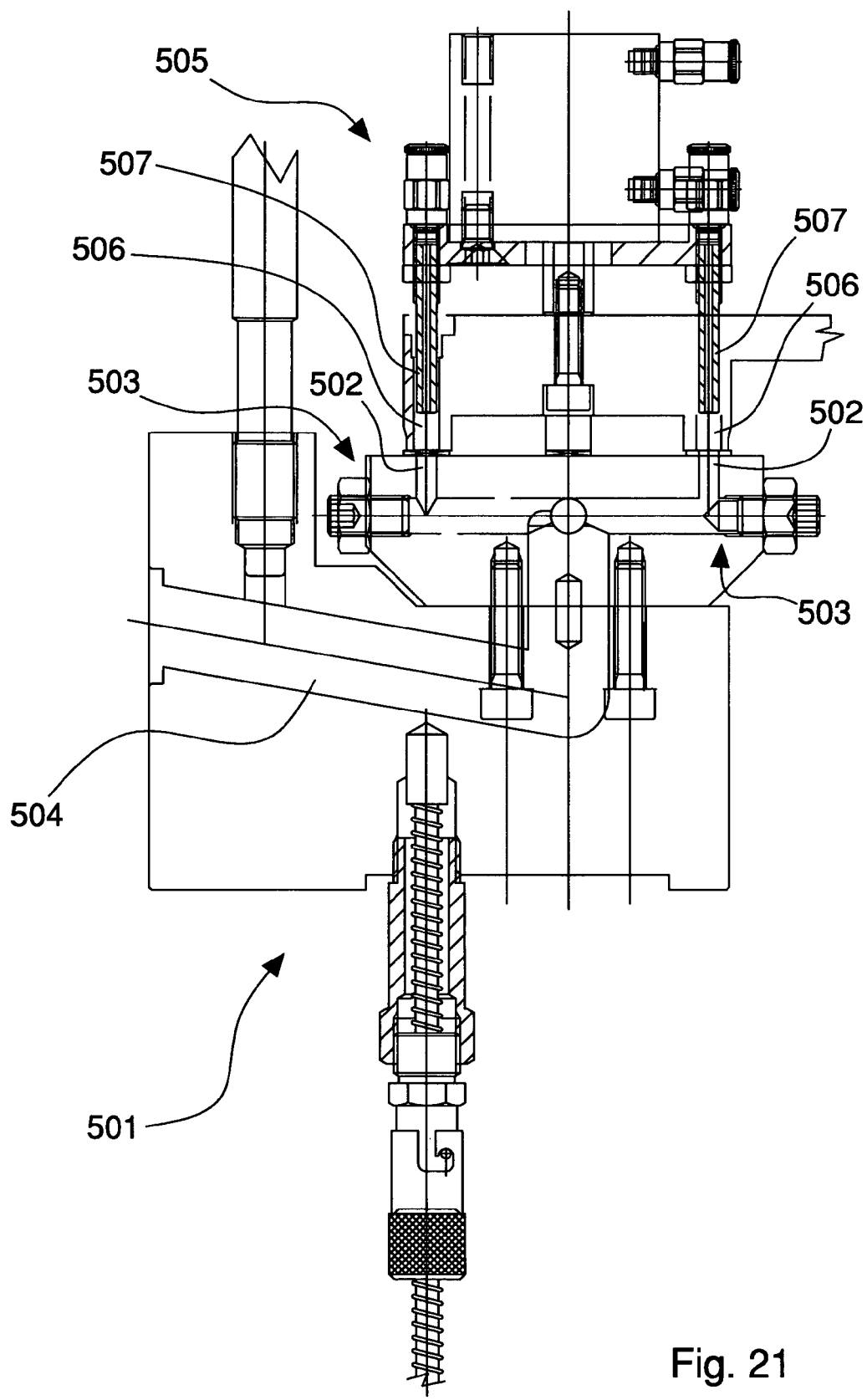
FIG. 21 is a vertically elevated schematic section of the extruding device in FIG. 20 in which a device is further shown for separating a plurality of doses of plastics from the flow dispensed through the extruding outlets.
Figure 22:
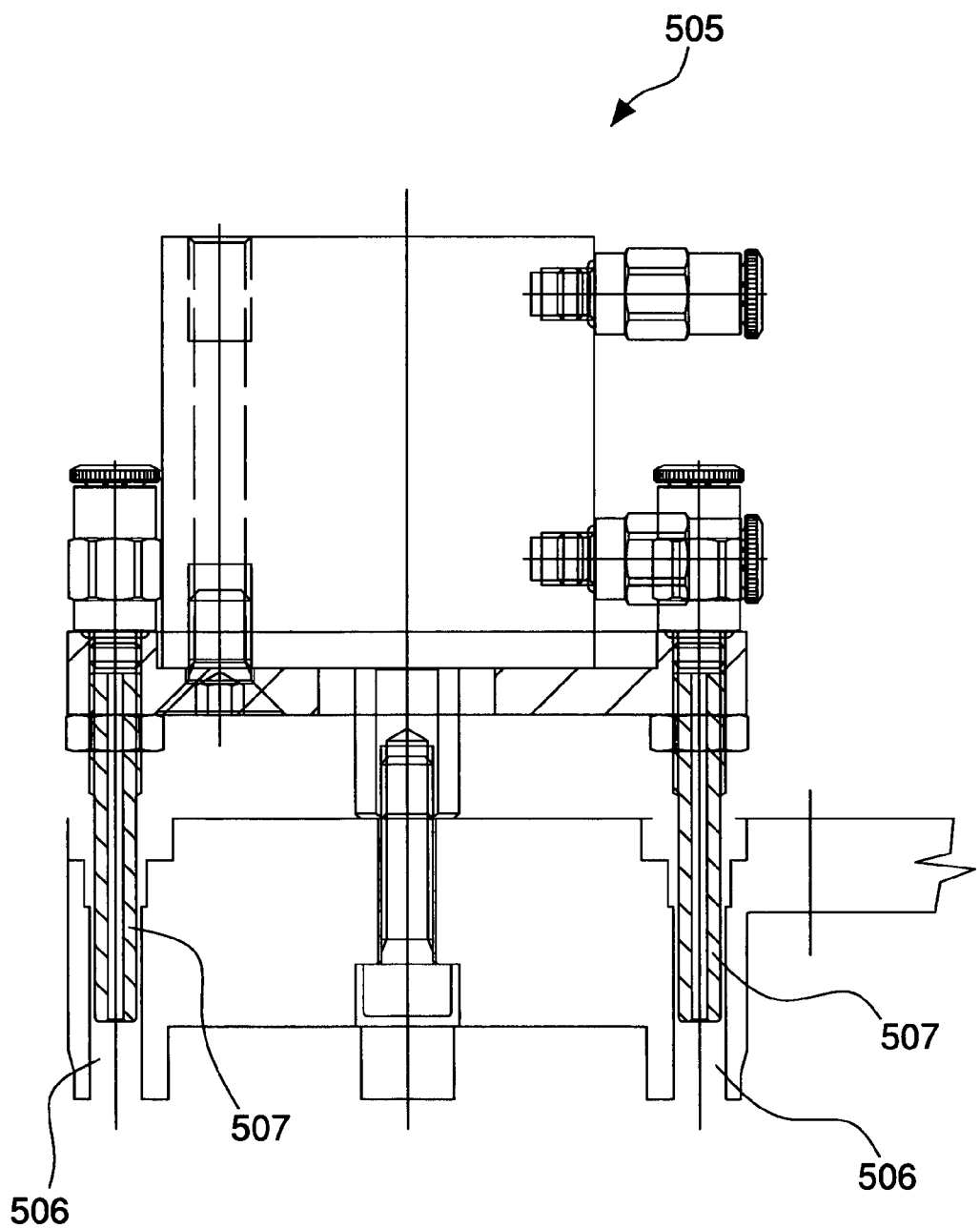
FIG. 22 is an enlarged view of the dose-separating device in FIG. 21.
Figure 23:
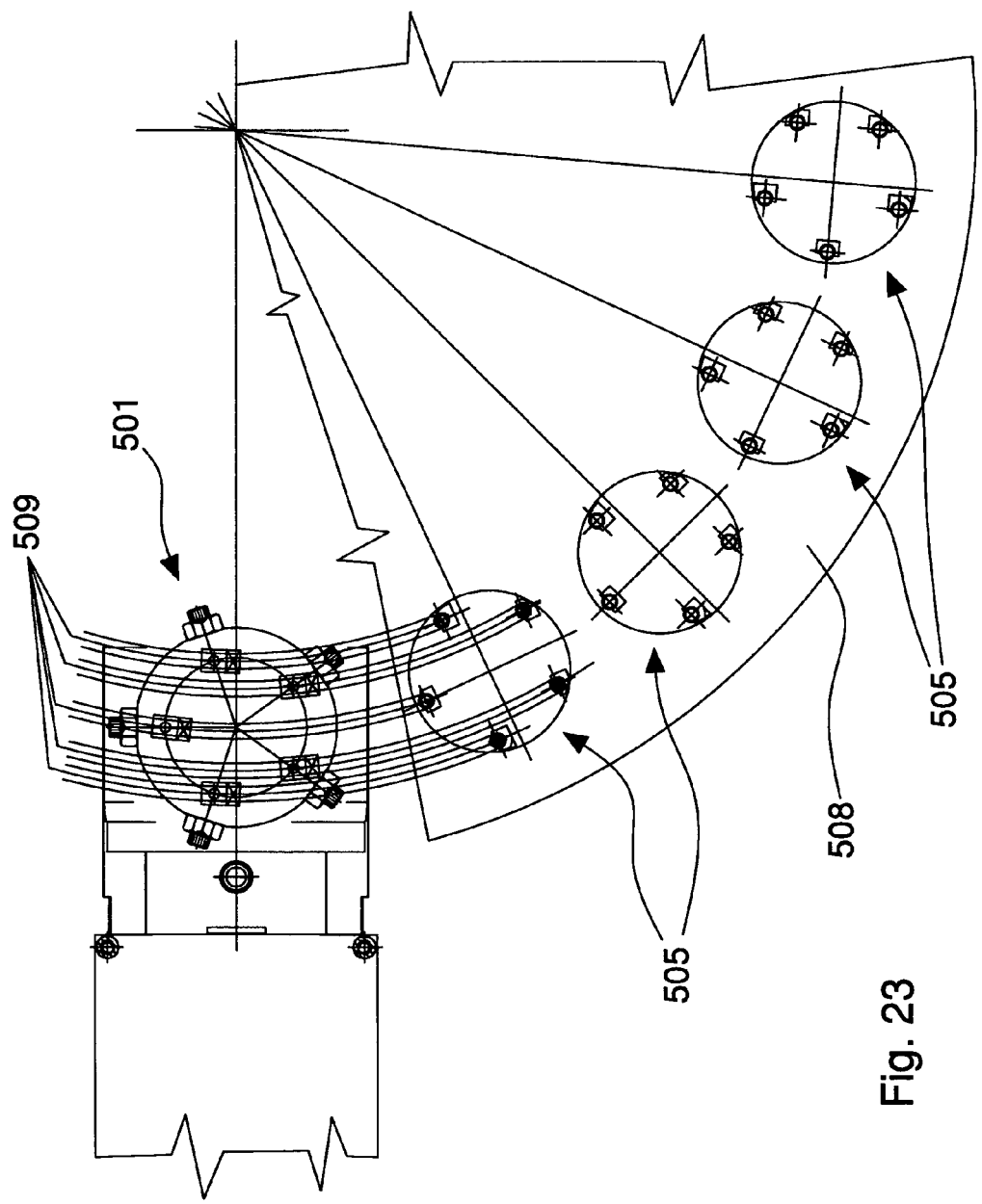
FIG. 23 is a top plan view of a rotating carousel provided with a plurality of separating devices like that in FIG. 22, each of which operates to separate the doses of plastics from the extruder in FIG. 20.
Figure 24:
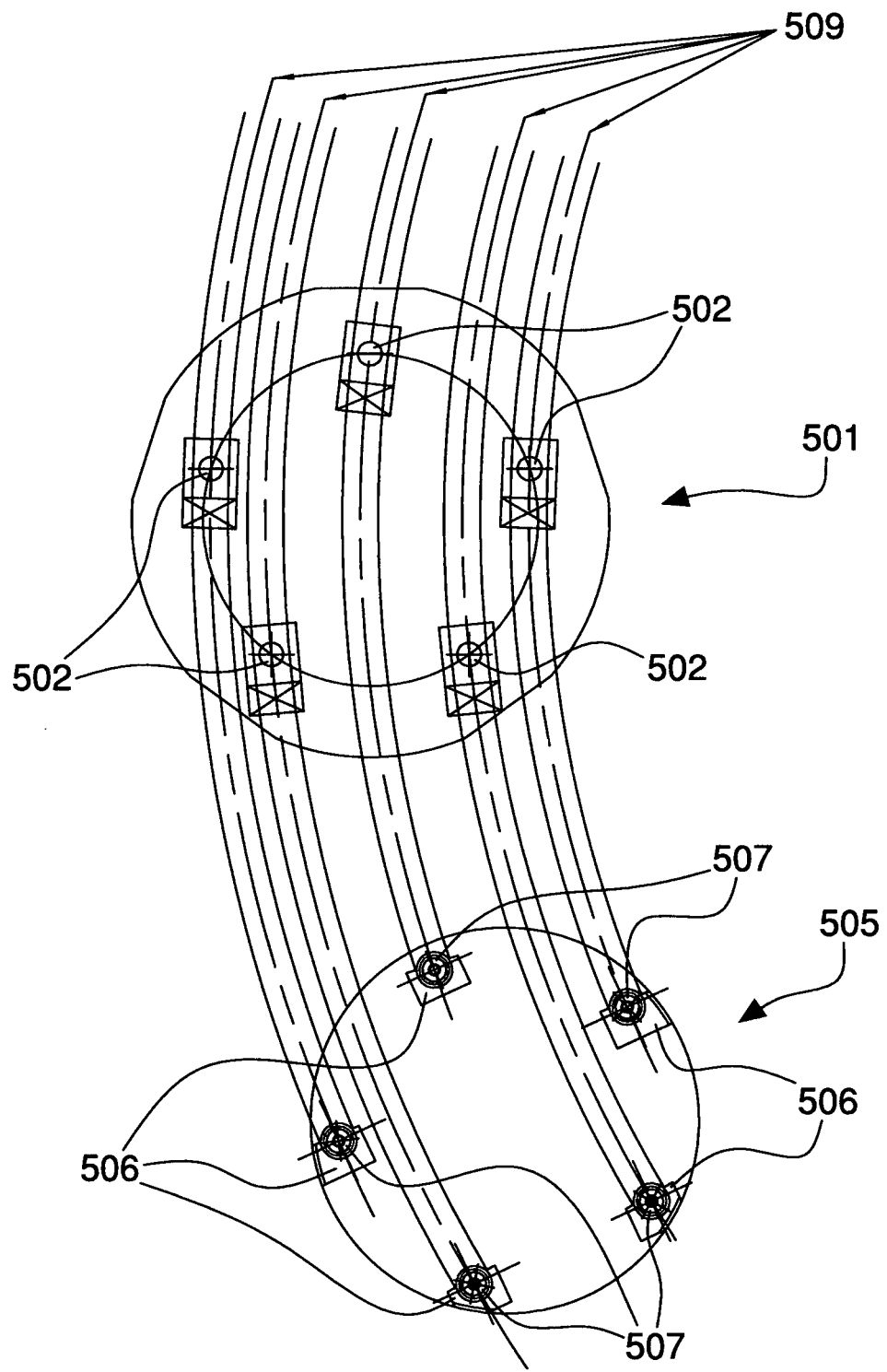
FIG. 24 is an enlarged detail in FIG. 23 in which are traced the trajectories of separating elements of a separating device, each of which separates a dose of plastics from a respective extruding outlet.

FIGS. 18 and 19 show an apparatus for forming annular objects according to an alternative embodiment. The annular objects formed by the apparatus in FIGS. 18 and 19 can be seals, for example having cross sections of the type shown in FIGS. 15 to 17, arranged inside caps made of metal or plastics, for example caps of the type shown in FIGS. 15 to 17. The materials used for forming the seals in the apparatus in FIGS. 18 and 19 can be the same materials listed previously with reference to the apparatus 1.

As shown in FIG. 18, the apparatus comprises a dispensing unit 93 including an extruding device 68 provided with a screw 69 for extruding plastics in an extruding direction that, in the example shown, is substantially horizontal. The extruded plastics are in a pasty state.

The apparatus further comprises a dispensing device including a dispensing nozzle 70 arranged for receiving the plastics coming from the extruding device 68 and for dispensing the plastics inside a cap 410, which in the example shown is a twist-off lid.

The dispensing nozzle 70 can be tilted in such a way as to dispense the plastics in an outlet direction tilted with respect to the vertical direction.

The dispensing nozzle 70 is connected to the extruding device 68 by means of a block 71 inside which a passage 72 is obtained for the plastics. The passage 72 may comprise a first substantially horizontal portion followed by a second tilted portion, so as to deviate the plastics from the extrusion direction to the direction of exit from the dispensing nozzle 70.

The dispensing nozzle 70 comprises a plug 73, having, for example, the shape of a stem, that is slidable inside the dispensing nozzle 70 so as to open or close the dispensing nozzle selectively, to permit or interrupt the dispensing of the plastics. The plug 73 can be moved by a motor 74, for example fixed to the extruding device 68 by a flange 75. Alternatively to the motor 74, it is possible to use other movement systems for driving the plug 73, for example a piston, a solenoid valve or a rotating motor.

The dispensing nozzle 70 is positioned above a supporting element 139 suitable for supporting temporarily the cap 410. The supporting element 139 may have the shape of a disc fixed to the top of a column 76. With the supporting element 139 a retaining arrangement is associated for retaining the cap 410 in contact with the supporting element 139 whilst the plastics are deposited inside the cap 410. The retaining arrangement may comprise a sucking device including, for example, a sucking source that is not shown that is connected, through a sucking conduit 77 obtained inside the column 76, to a plurality of sucking holes 78 of the supporting element 139.

Alternatively, the retaining arrangement can comprise a gripper device, or a magnet, or also a solenoid valve or something else.

The apparatus further comprises a movement arrangement for moving the supporting element 139 with respect to the dispensing nozzle 70 whilst the plastics are dispensed inside the cap 410. In this manner, the zone of the cap 410 in which the plastics are dispensed changes continuously whilst the dispensing nozzle 70 is open. This enables the plastics to be dispensed inside the cap 410 according to a desired path, such as to shape an extruded product having any preset shape.

In particular, the movement arrangement may comprise a rotating member for rotating the supporting element 139 around a rotating axis Z, for example vertical, such as the axis of the column 76. In this manner, as the dispensing nozzle 70 is arranged in a fixed position during dispensing, the plastics are deposited on the cap 410 according to an annular geometry, in particular a circumference shape.

The rotating member may comprise a motor device 79, fixed to a base 80 of the apparatus, having a driving shaft 81. On the driving shaft 81 a driving pulley 82 is splined that drives, by a drive belt 83, a driven pulley 84 that is stiffly connected to the column 76. The latter is mounted inside a sleeve 85 fixed to the base 80. Between the sleeve 85 and the column 76 bearings 86 are interposed that enable the column 76 to rotate with respect to the sleeve 85.

During operation, a cap 410 is positioned on the supporting element 139 by means of a supplying device that is not shown. The sucking device is activated to retain the cap 410 firmly in contact with the supporting element 139.

The motor 74 drives the plug 73 such as to open the dispensing nozzle 70, which is positioned inside the cap 410. The plastics exiting the extruding device 68 through the passage 72 reach the dispensing nozzle 70, which deposits the plastics on a supporting surface 87, which is the internal surface of the cap 410 on which the seal has to be formed. Simultaneously, the movement arrangement rotates the column 76, together with the supporting element 139, around the rotating axis Z. The cap 410, maintained adhering to the supporting element 139 owing to the sucking device, also rotates the supporting element 139 around the rotating axis Z whilst the dispensing nozzle 70 dispenses the plastics. In this manner, the plastics are deposited on the supporting surface 87 so as to form a precursor of the seal, said precursor having an annular, particularly circular conformation. The precursor of the seal can have an approximately circular cross section, even if this condition is not necessary.

When the precursor of the seal has been completed, the plug 73 closes the dispensing nozzle 70 and the cap 410 can be moved away from the dispensing nozzle 70 to complete forming of the seal.

In an embodiment that is not shown, instead of moving the cap 410 and maintaining the dispensing nozzle 70 stationary, it is possible to move the dispensing nozzle 70 and maintain the cap 410 stationary. The dispensing nozzle 70 can be moved by a suitable movement arrangement, which may comprise a rotating member to rotate the dispensing nozzle 70 around a rotating axis, for example a vertical rotating axis.

In another embodiment that is not shown, the movement arrangement can be associated both with the dispensing nozzle 70 and with the cap 410, so as to move suitably the dispensing nozzle 70 and the cap 410 so that the plastics can form the precursor desired on the supporting surface 87.

In the last two cases disclosed, in which the dispensing nozzle 70 is moved, the dispensing nozzle 70 can be connected to the extruding device 68 by flexible conduits or by a rotating joint.

The movement arrangement can enable the dispensing nozzle 70 and the cap 410 to move mutually with a movement that is not necessarily a rotation movement. This enables annular seals to be obtained that have a shape that is not necessarily circular, for example elliptical, square, polygonal or other.

In an alternative embodiment, the supporting surface 87, rather than being the internal surface of the cap 410, can be the surface of a mechanical component included in the apparatus on which the seal is formed, which will subsequently be removed from the supporting surface 87 and applied to a corresponding cap.

The apparatus further comprises a forming arrangement to shape the precursor so as to obtain the desired annular object, for example the seal. The forming arrangement may comprise a compression-forming arrangement that compression-moulds the precursor so as to obtain the seal.

The forming arrangement is shown in FIG. 19 and may comprise a forming carousel 88 comprising a plurality of forming units 89, only one of which is shown.

Each forming unit 89 comprises a supporting member 90 for supporting a cap 410 inside which the plastics are deposited forming the precursor of the seal. The supporting member 90 may have an upper surface shaped so as to engage in a shapingly coupled manner with an external wall of the cap 410 opposite the supporting surface 87. The supporting member 90 is fixed to a stem 138, moved by an actuator that is not shown in a forming direction M that, in the example shown, is substantially vertical.

Each forming unit 89 further comprises a punch member 217 for shaping the precursor inside the cap 410 such as to shape the seal. The punch member 217 comprises a central element 218 having a front surface 219 suitable for coming to abut on the supporting surface 87 of the cap 410.

Outside the central element 218 there is arranged an intermediate sleeve 91, included in the punch member 217, bounded by a forming surface 92 having a shape corresponding to that of the desired seal. In the example shown, the forming surface 92 coincides with a lower surface of the intermediate sleeve 91.

The punch member 217 further comprises an external sleeve 220, arranged outside the intermediate sleeve 91, having an annular end 221 suitable for coming to abut on the supporting surface 87 of the cap 410. In this manner, the external sleeve peripherally bounds a forming chamber inside which the seal can be formed.

A spring element 94 can act on the external sleeve 220, so as to push the external sleeve 220 towards the supporting member 90.

During operation, a transferring device that is not shown conveys the cap 410 from the extruding unit 93 to a forming unit 89. The cap 410 is delivered to the supporting member 90, which the corresponding actuator has positioned in a position spaced away from the punch member 217.

The actuator then moves the cap 410 to the punch member 217, to a point in which the supporting surface 87 of the cap 410 abuts on the external sleeve 220. The intermediate sleeve 91 is in a retracted position with respect to the external sleeve 220 and to the central element 218, such that between the external sleeve 220 and the central element 218 an annular recess is defined in which the precursor of the seal can be received. The spring 94 can enable the external sleeve 220 still to retreat slightly, to enable the central element 218 to abut on the cap 218 and to enable the seal to be formed from the corresponding precursor.

When the seal has been formed and the shape thereof has been stabilised the actuator moves the supporting member 90 away from the punch member 217 and an extractor 95 detaches the cap 410 from the punch member 217. The cap 410 can thus be moved away from the supporting member 90, which is ready to receive a new cap to be processed.

As already mentioned previously, the apparatus comprises a transferring device for transporting the cap 410, having the precursor of the seal inside, from the dispensing unit 93 to a forming unit 89. The transferring device can convey the cap 410 along a short path, so as to ensure a short transfer time to prevent the precursor of the seal cooling and hardening excessively.

Alternatively, along the path of the transferring device a heating device can be positioned to prevent the plastics constituting the precursor of the seal and/or the cap 410 cooling excessively. The heating device may comprise, for example, a tunnel inside which hot air circulates, or a radiofrequency heater, if the cap 410 is made of metal material.

Different possible alternatives are possible for the layout of the apparatus.

In a first embodiment, the dispensing unit 93 can be configured as an independent machine, connected, by the transferring device, to a further independent machine on which one or more forming units 89 are mounted.

In a second embodiment, the dispensing unit 93, the conveying device and the forming unit 89 (or the forming units 89) can be integrated into a single machine. The machine can comprise a first carousel that makes the caps 410 interact with the dispensing nozzle 70, a possible second transferring carousel and the forming carousel 88 supporting a plurality of forming units 89.

In a third embodiment, dispensing the plastics for forming the precursor and the forming of the seal by the precursor can be integrated into a single device. For example, a main carousel can be provided having a plurality of forming units 89, each of which comprises the supporting member 90 and the punch member 217. After a cap 410 has been positioned on a corresponding supporting member 90, the latter, which is still spaced away from the corresponding punch member 217, can interact with a dispensing nozzle 70 that deposits inside the cap 410 the plastics for forming the precursor of the seal. The supporting member 90 can rotate around an own axis to enable the plastics to form an annular precursor.

Subsequently, during rotation of the main carousel, the forming unit 89 disengages from the dispensing nozzle 70 and the corresponding actuator moves the supporting member 90 to the punch member 217 so that the precursor can be shaped to give rise to the seal.

It should be noted that the forming units 89 do not necessarily have to be mounted on a carousel, but can also be moved along a non-circular path, for example by means of a belt device.

Further, in all the embodiments downstream of the forming units 89, accessory devices can be provided, for example vision systems for controlling the quality of the cap and/or of the seal.

The apparatus shown in FIGS. 18 and 19 enables seals to be formed with reduced consumption of plastics. The punch member 217 ensures that the seals have a precise shape, whilst the dispensing nozzle 70 ensures that the quantity of plastics that forms each seal is well dosed. Lastly, the apparatus shown in FIGS. 18 and 19 enables seals to be formed by using many types of different plastics that the user can select freely according to need.

Forming an object made of plastics (in particular of annular shape) is now disclosed (with particular reference to FIGS. 20 to 37), which may comprise, as in this specific case, a seal for a closure for containers of known type (capsule, cap, lid, etc). The closure may be made of plastics and/or of metal and/or of still other known materials. As is known, the seal is generally intended to make a seal on an upper edge of the mouth of the container.

The object (seal) is in particular made by compression-moulding plastics. The object can have an annular, open or closed, shape. In this specific case, the object (seal) has a closed circular shape. The object can be made of any plastics, for example a thermoplastic and/or elastomeric material, for example of the type used for forming seals for closures of containers.

The object is in particular formed by a forming process that comprises a step of depositing two or more (in the cases illustrated here five, six, or seven) doses of plastics on a resting surface and thus a step of compression-moulding the aforesaid doses inside a forming chamber (of annular shape) in which the material of the various doses is joined so as to form the object (of annular shape).

Compression-moulding is optionally achieved by a compression punch with at least a partially annular (open or closed) shape. The moulding chamber in which the doses are compressed is optionally at least partially annular (open or closed). The doses can be wholly or partially deposited on a resting surface that in the moulding step bounds at least a part of the compression-moulding chamber (of open or closed annular shape). The doses are deposited optionally on a peripheral zone of the resting surface that surrounds a central region of the resting surface that, during compression-moulding, is occupied by a punch part that obstructs the flow of the plastics. The doses are optionally placed angularly spaced around the central region of the resting surface.

The doses, which in the example illustrated here have a section that has a substantially circular shape, can also have other shapes (for example an oblong shape or a circular-sector shape or a curved shape). It is possible to deposit (for subsequent compression-moulding) doses that are different in shape from one another.

The n doses ("n" being a whole number>1) made of plastics to be deposited (and then formed in a compression-moulding chamber) can be separated in a substantially simultaneous manner from n extruding outlets each arranged for dispensing (in a continuous manner) a flow of extruded plastics. The doses can be separated by using a movable separating device provided with n separating elements, each of which separates (by cutting or shearing) a single dose from a respective extruding outlet. The separating device is optionally movable between the separating zone (cutting or shearing) of the doses, where the various extruding outlets are located, and the dose-depositing zone for depositing the doses on the resting surface, on which surface the object will then be formed through compression-moulding of plastics.

The separating device can be configured such that the various separating elements (each separating a single dose) are mutually positioned in a similar manner to the arrangement that the doses will have to have in the moulding chamber (of open annular or closed shape). In substance, the separating device could be configured so that the "n" separating elements are arranged with a peripheral distribution around a central region. Such a peripheral distribution could be a circumferential distribution.

The separating elements can operate by passing in front of the corresponding extruding outlets so as to cut or shear a dose of plastics and so as to retain the dose of plastics as far as the depositing place. It is possible to provide, in the place of depositing of the dose on the resting surface, detaching arrangement for detaching the dose retained by the separating element that has previously separated (via cutting or shearing element) the dose. It is possible to provide that such detaching arrangement comprises, for example, at least one pushing element, for example of the piston and/or compressed-air type, that pushes the dose (generally downwards).

With reference now to FIGS. 20 to 24, an extruder made of plastics with multiple outlets has been indicated overall by 501, the extruding outlets (five in this specific case) have been indicated by 502, the dispensing flow control devices have been indicated by 503 (for example needle valves, one for each extruding outlet), a supply collector for supplying the plastics at the extruding outlets has been indicated by 504. In this specific case, the extruding outlets 502 are each configured so as to dispense a continuous extruding flow directed upwards.

A device for separating doses of plastics from the flow dispensed by the extruding outlets has been indicated overall by 505, a single separating element or tool has been indicated by 506 that cuts or shears a dose passing in front of a respective extruding outlet, 507 indicating a single pushing element (of the piston type) that detaches the dose from the respective separating tool, 508 indicating a rotating carousel that rotates, distributed on the periphery thereof, a plurality of separating devices 505, 509 indicating the circular trajectories of the separating elements or tools 506 rotated by the carousel.

Each separating tool 506 optionally has a concave surface with the concavity facing forwards to an advancing direction of the tools; the advancing direction can be, as in this specific case, a circular trajectory defined by the movement of a rotating carousel for conveying the tools.

Figure 25:
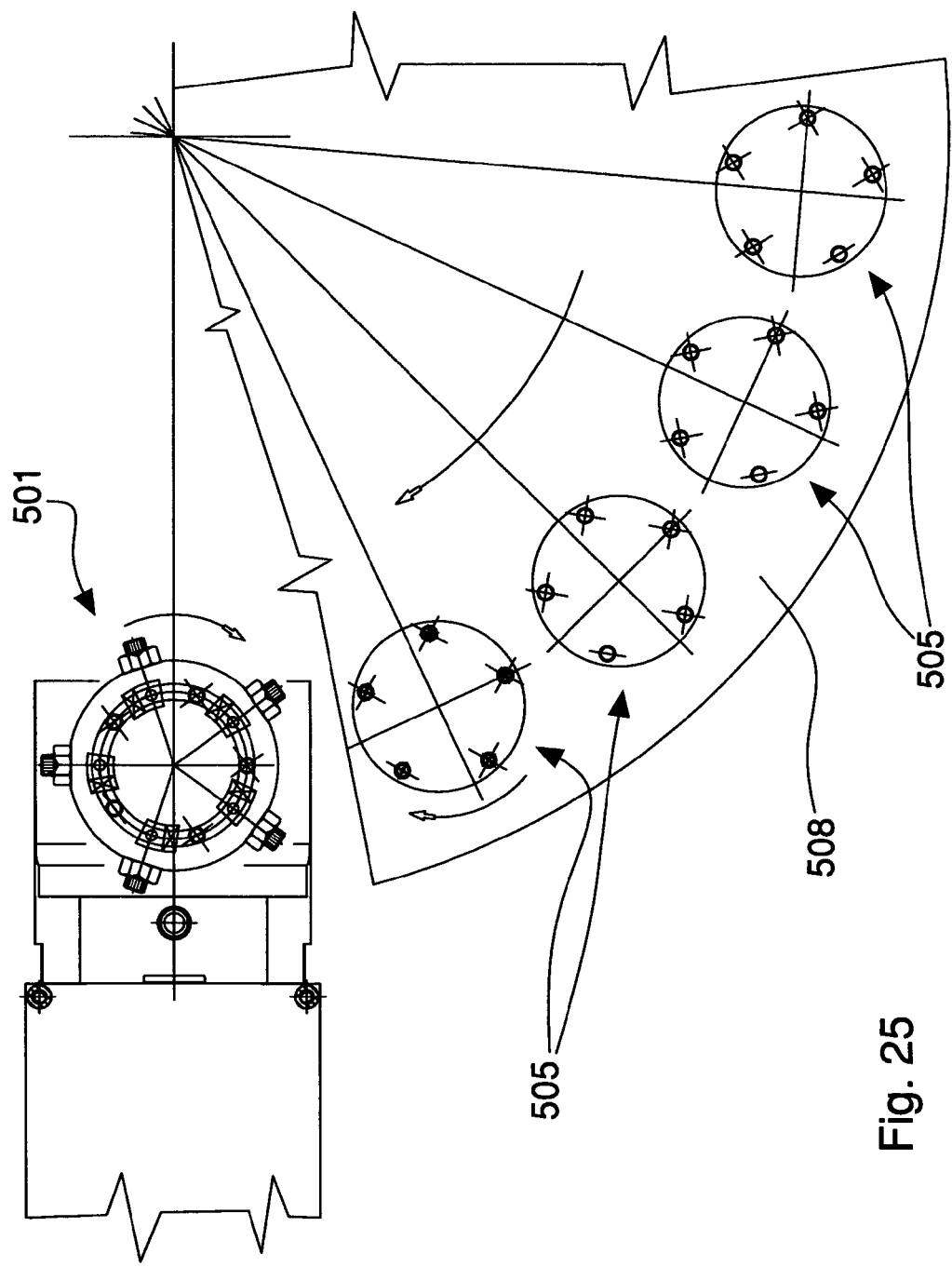
FIG. 25 is a top plan view of a different embodiment of a rotating carousel operationally associated with a multiple-outlet extruder for plastics.

With reference to FIG. 25, another embodiment is illustrated (maintaining for the sake of simplicity the same numbering as for the elements that are similar to those disclosed previously), in which, further to the rotational movement of the carousel 508, there is provided a further movement of each single separating device 505 with respect to the carousel 508. This movement can further be, as in the specific case illustrated here, a rotation movement, optionally around a rotation axis that passes through the centre of the circumference on which the separating elements 506 are arranged and which is normal to such a circumference. Such a further relative movement of the separating elements with respect to the carousel can be performed with the object of promoting cutting or shearing of the multiple doses. It is possible to provide also a part of the extruder 501 with the possibility of rotating on itself (for example in a direction opposite the rotation of the separating device 505) in particular a part that has the extruding outlets 502. Such a rotating part could comprise a block that defines the plastics dispensing nozzles terminating with the extruding outlets 502. The rotation axis would pass through the centre of the circumference on which the extruding outlets 502 are arranged. The rotating block will in this case have a central passage that, on one side, will be connected to the supply of melted plastics, and, on the other side, will be connected to the various extruding outlets 502. The possibility of moving the extruding outlets can be used to promote the separation (shearing) of the multiple doses.

Figure 26:
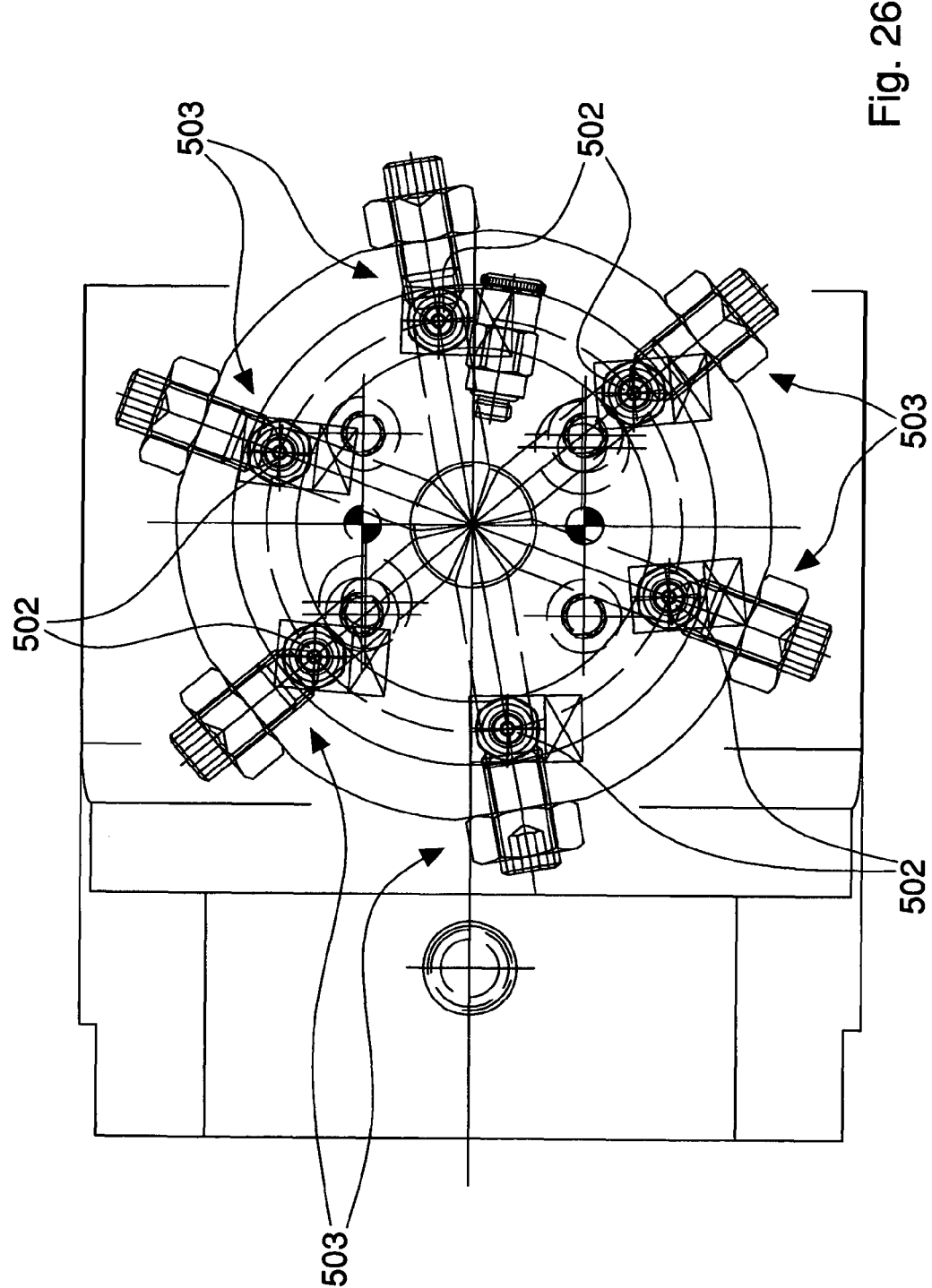
FIGS. 26 and 27 are two top plan views of two different embodiments of a multiple-outlet extruding device having a different number of extruding outlets with respect to the example in FIG. 20.
Figure 27:
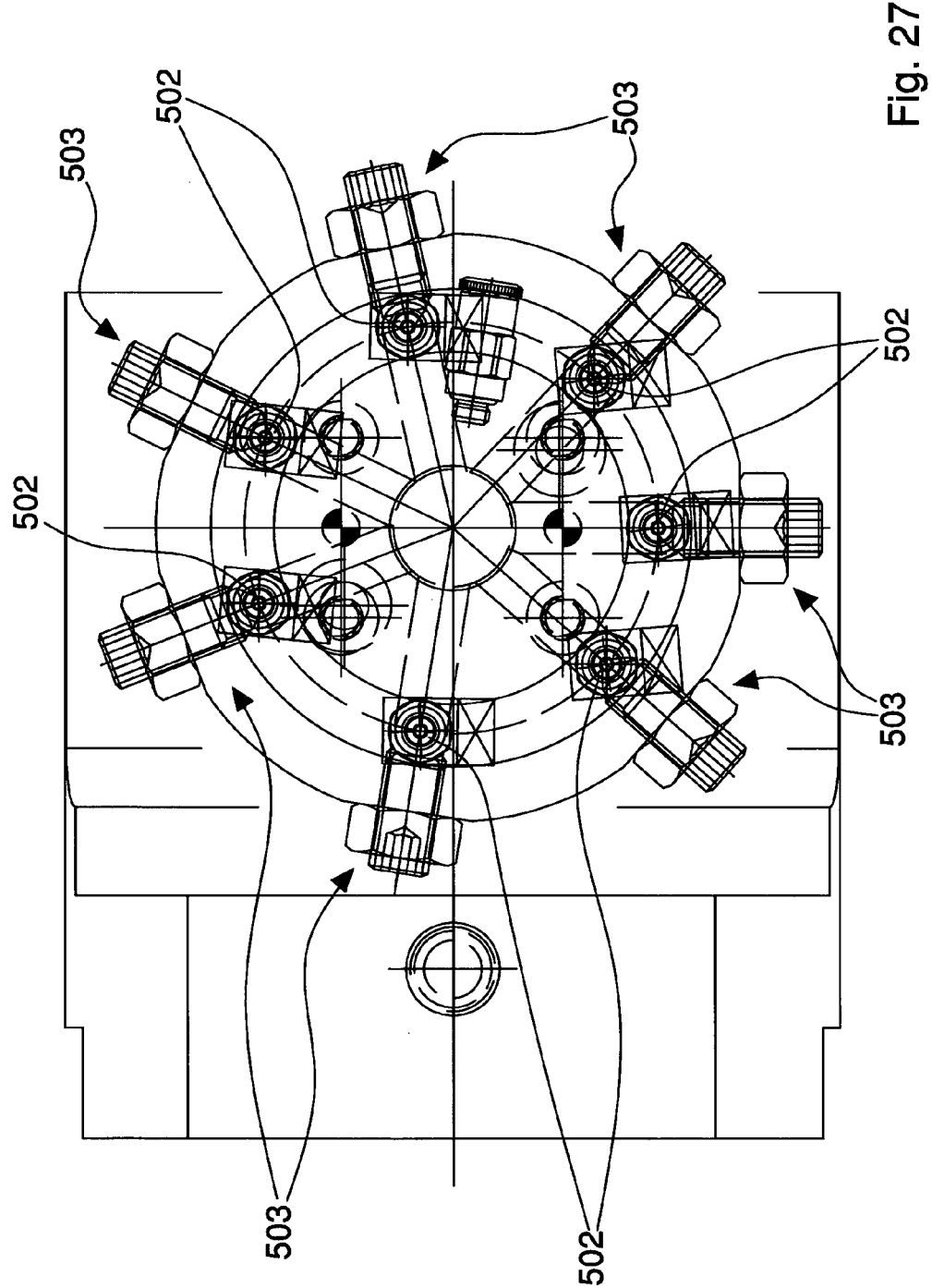

With reference to FIGS. 26 and 27 there are illustrated (maintaining the same numbering as for the similar elements), two examples of an extruder having, respectively, six or seven extruding outlets 502. The separating device will have, in these cases, a corresponding number and a similar distribution of the separating tools.

With reference to FIG. 37 there is illustrated (maintaining the same numbering as for the similar elements) an example of an extruder having extruding outlets 502 with different shapes. In this specific case, some extruding outlets 502 have an oblong shape whilst other extruding outlets 502 have a circular shape. The separating device will in this case have a corresponding shape and distribution of the separating tools.

Figure 28:
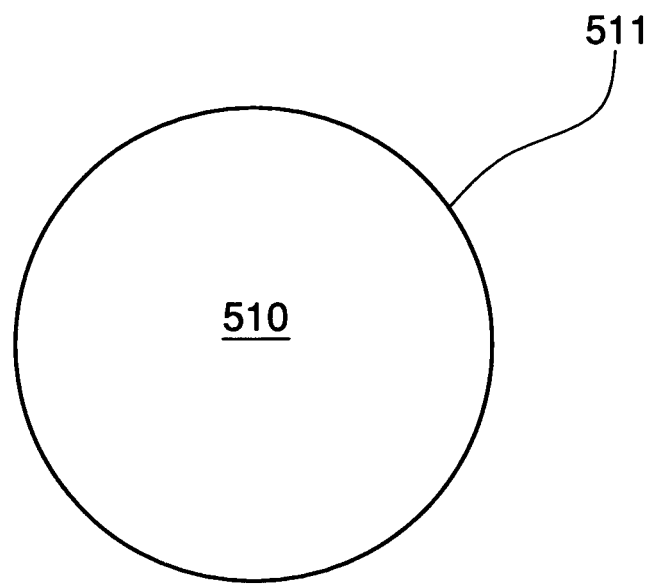
FIGS. 28 and 29 are a top view and, respectively, a side view of a cap on which a seal is formed.
Figure 29:
Figure 30:
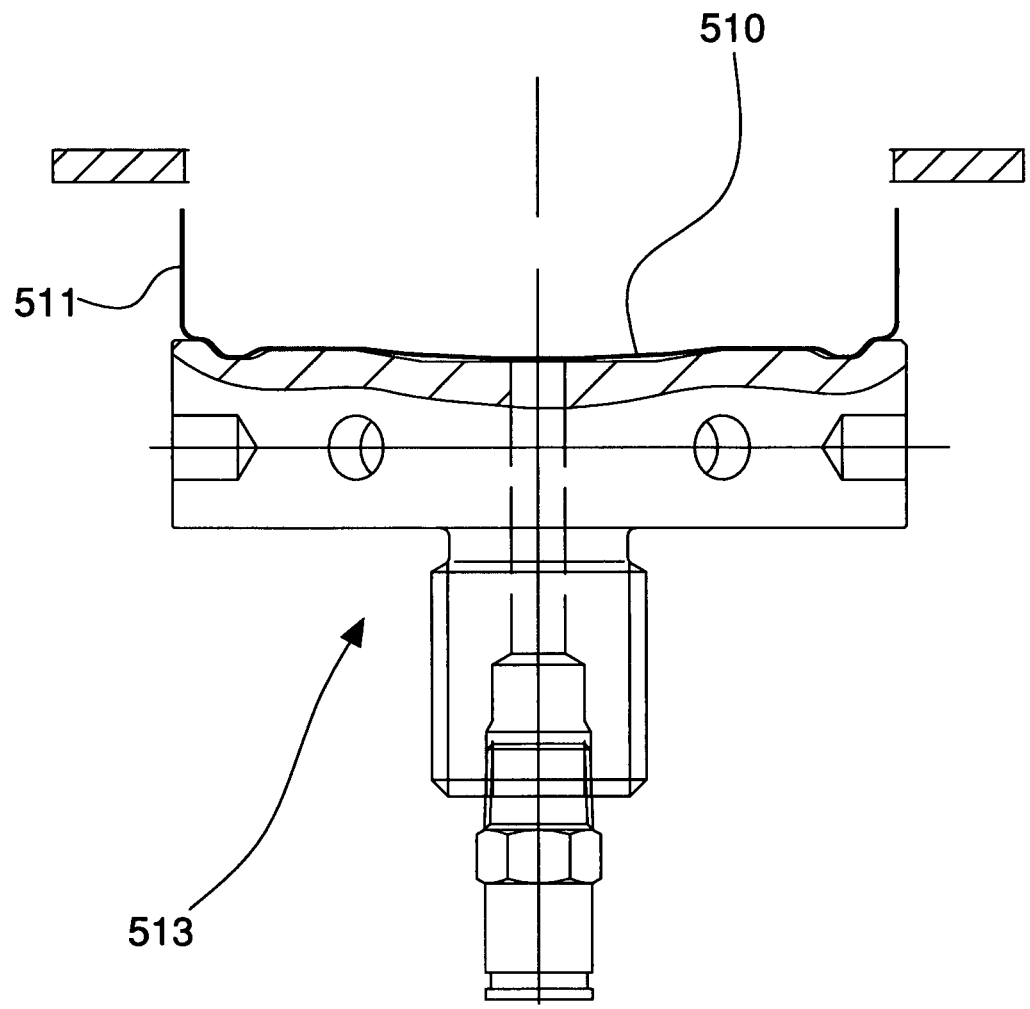
FIG. 30 is a vertically elevated view of a support for the cap in FIGS. 28 and 29 on which forming of the seal occurs.
Figure 31:
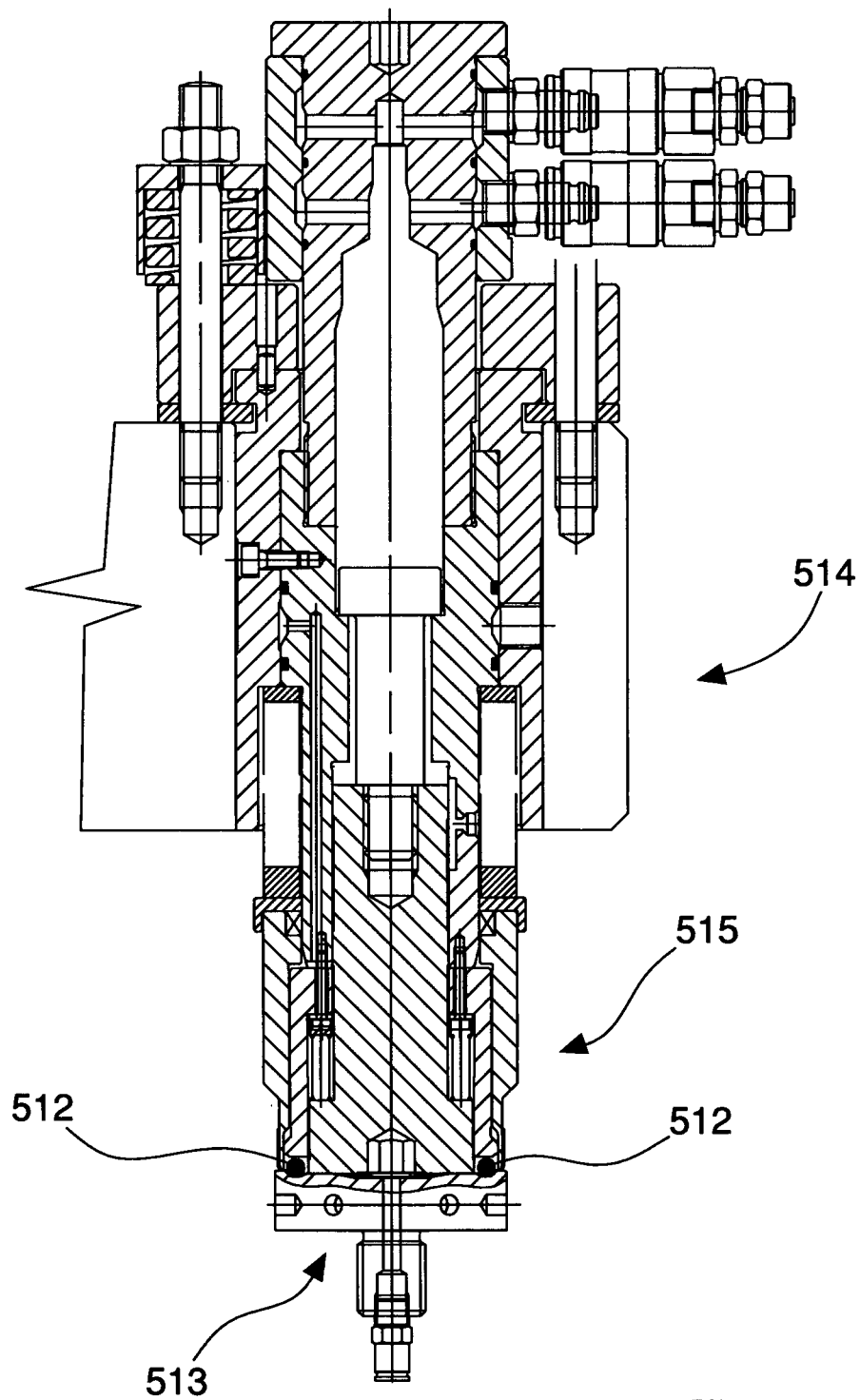
FIG. 31 is a vertically elevated view of a moulding device in which the separating device in FIG. 22 has already deposited a plurality of doses inside the cap in FIGS. 28 and 29 carried by the support in FIG. 30 and in which a punch inserted into the cap is ready to compression-mould the doses to form the seal.
Figure 32:
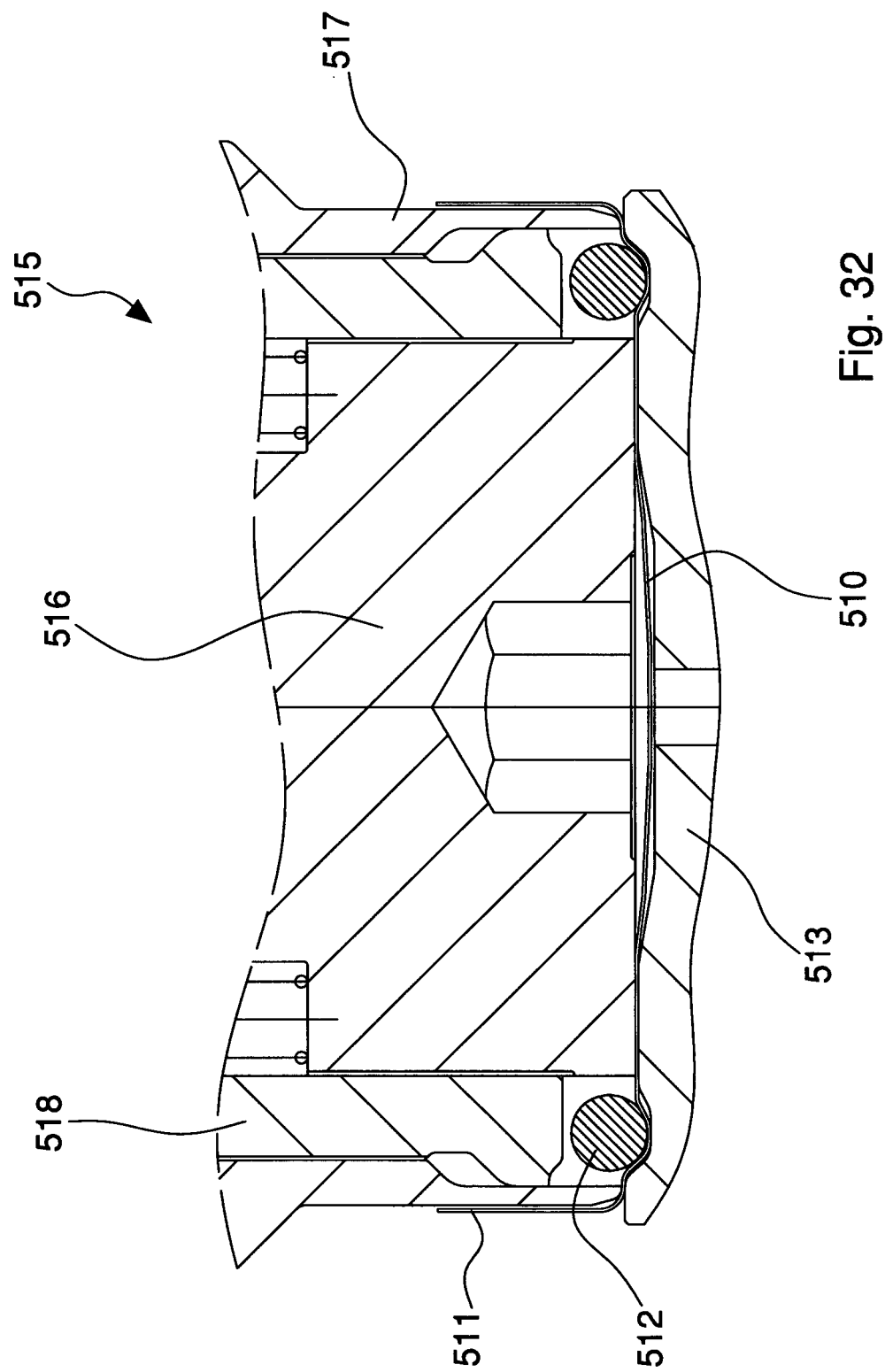
FIG. 32 is an enlarged detail of FIG. 31.
Figure 33:
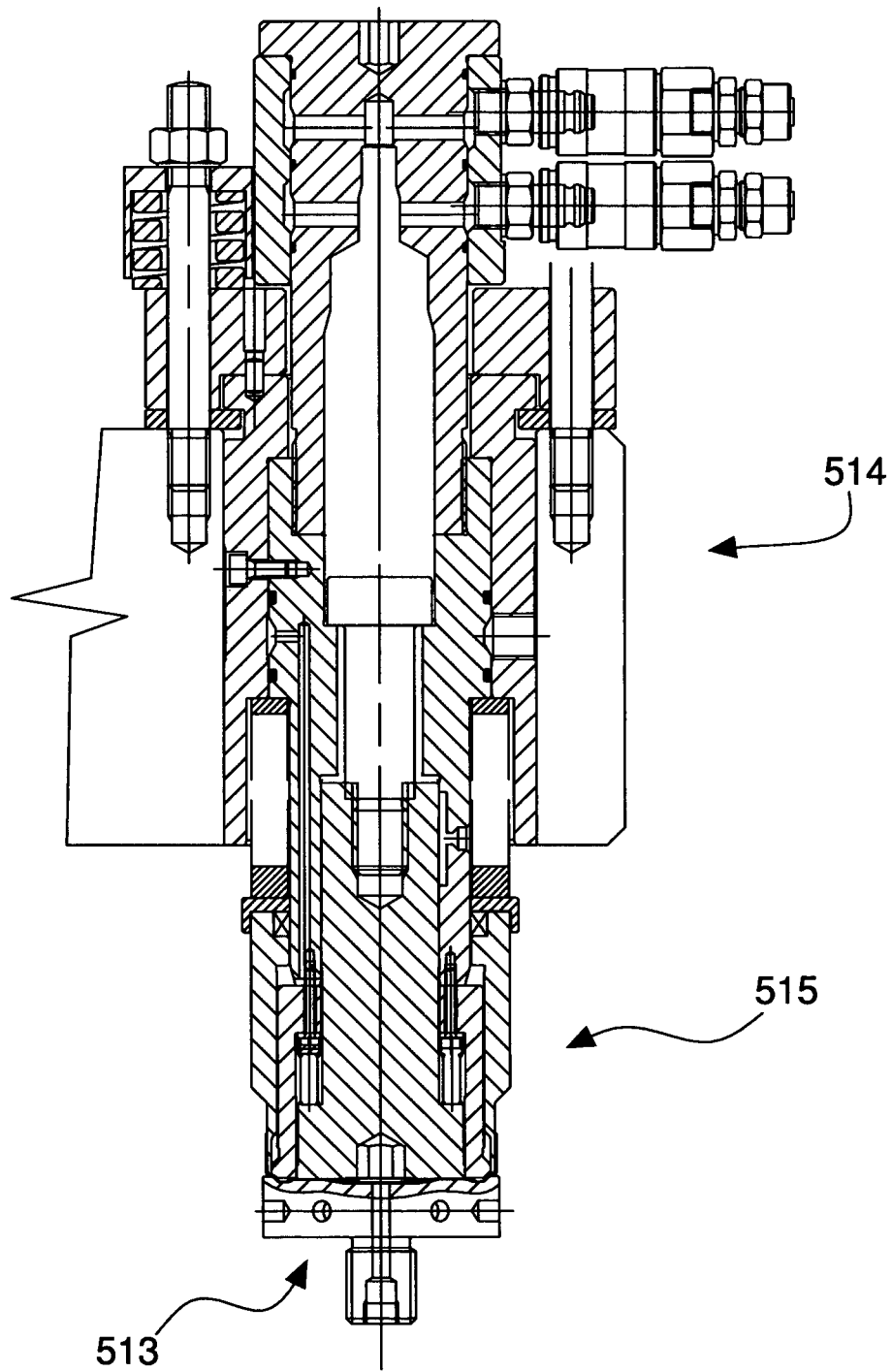
FIG. 33 is the view in FIG. 31 with the punch in a different operating configuration.

The doses separated by the separating device 505 will be deposited, by the pushing elements 507, inside the capsule illustrated in FIGS. 28 and 29 to make the seal inside the capsule.

The capsule comprises, in this specific case, a closing wall 510 intended for closing the upper mouth of a container and a tubular-shaped side wall 511. The seal has to be formed on a peripheral zone of the internal surface of the closing wall 510; this peripheral zone is also a zone arranged next to the side wall 511.

With reference now to FIGS. 30 to 36, the doses of plastics are indicated by 512 that have been deposited by the separating device on the internal surface of the wall 510 of the capsule, 513 being a support that bears the capsule, 514 being overall a compression-moulding device, 515 being a compression punch that forms the seal by compressing the doses 512 on the caps.

It is possible to use a moulding apparatus of the rotating carousel type provided on the periphery thereof with a plurality of moulding devices 514, each of which comprises a support 512 and a punch 515. The multiple doses 512 can be deposited in a release zone coinciding, for example, with a meeting zone between the carousel 508 that carries the separating devices 505 and the moulding carousel that carries the compression-moulding devices.

It is further possible to provide a device of known and non-illustrated type, to supply the capsules to the various moulding devices of the moulding carousel and a device, which is also known, for removing the capsules with the formed seal from the carousel.

The compression punch 515 comprises an internal member 516, an external member 517 of annular shape and an intermediate member 518 which is also of annular shape (coaxial with the external member 517) and arranged between the external member 517 and the internal member 516. The three members 516, 517 and 518 of the compression punch 515 and the closing wall 510 are configured for assuming an operating configuration in which they define a moulding chamber 519 (of annular shape) in which the doses 512 are compression-moulded. The intermediate member 518 (that defines above the moulding chamber 519) is movable with respect to the other two members 516 and 517 so as to be able to exert the compression action.

It is possible to provide a thermal conditioning arrangement (not illustrated) for thermal conditioning (in particular for cooling) of the compression punch. In particular, the member that compresses (represented in the specific case illustrated here by the intermediate member 518) could bear internally at least a part of a thermal-conditioning circuit (cooling circuit) connected to a system for supplying a thermal conditioning fluid. connected to a system for supplying a thermal conditioning fluid.

Figure 34:
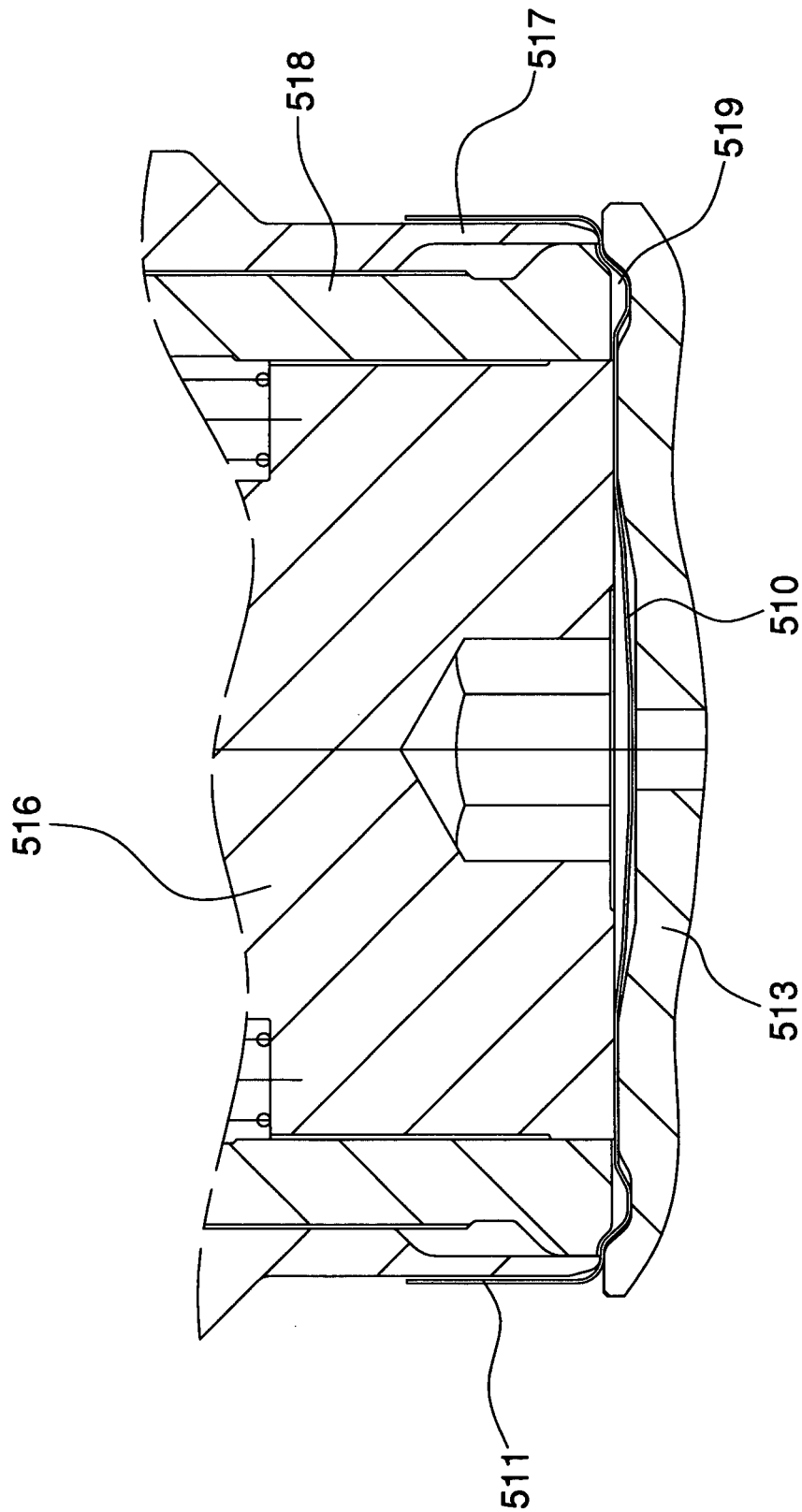
FIG. 34 is an enlarged detail of FIG. 33.
Figure 36:
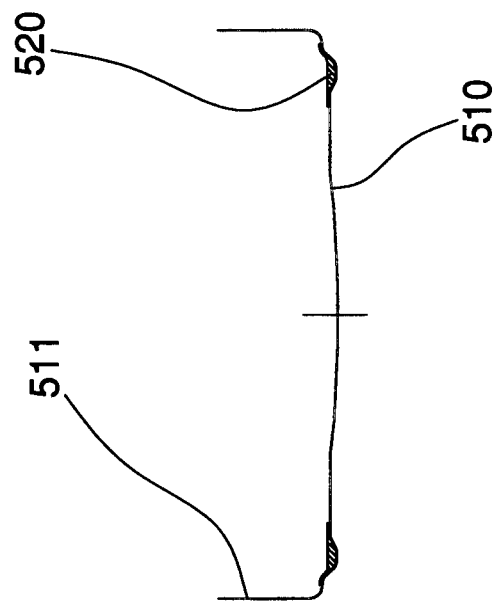
FIG. 36 is the view of the cap in FIG. 29 with the ready-formed seal.
Figure 35:
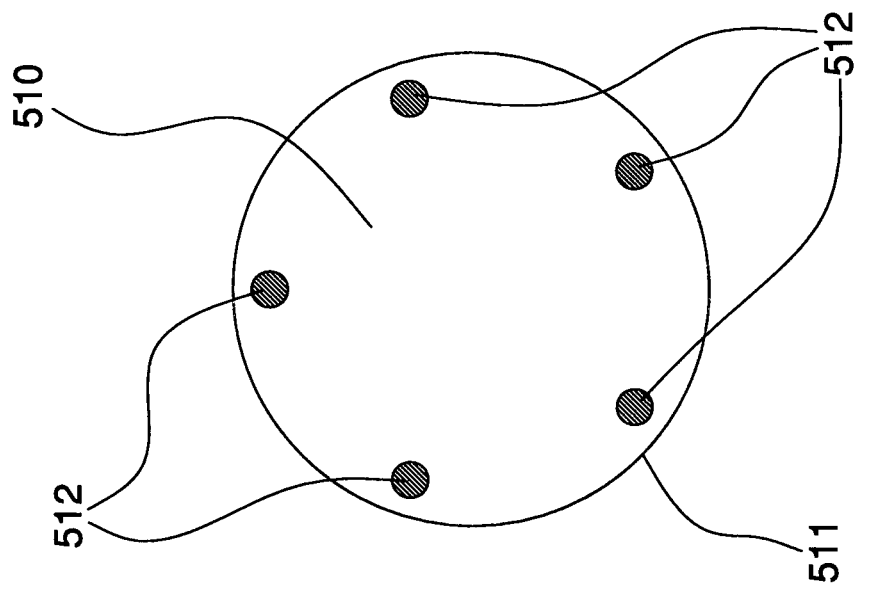
FIG. 35 is the view of the cap in FIG. 28 inside which the doses of plastics have been deposited to form the seal.

In FIG. 34 there is shown the moulding configuration in which the intermediate member 518 has been lowered to compress the plastics and thus form the seal 520 (with a closed annular shape). The internal member 516 obstructs the flow of compressed melted material to the inside, whilst the external member 517 obstructs the flow to the outside. In FIG. 36 there is illustrated the capsule with the seal 520, which in this specific case is of a closed annular shape.

As already said, it is possible to use a different number of doses, for example in function of the volume of plastics to be used and/or the shape of the object to be formed.

In use, the object (seal) forming process optionally comprises the steps of forming, transferring, depositing and moulding the doses, which can occur, as in the case illustrated here, in a continuous manner. A control unit that is known and not illustrated is configured for controlling various steps of the process. The doses are formed optionally by (substantially simultaneous) separating of the n doses from the n extruding outlets. The doses are separated optionally by cutting or shearing by the n separating elements or tools that pass in front of the n extruding outlets. It should be observed that the n extruding outlets are optionally arranged with the same distribution that the doses will have in the moulding chamber before compressing (in which the doses will be joined or welded together to form the object).

The doses are optionally moved by moving the separating tools that retain the corresponding doses (as known, by exploiting the adhesive capacity of the plastics in melted state). The doses are deposited, simultaneously for all the n doses, by means of activation of the detaching arrangement that pushes the n doses 512 onto the resting surface (the wall 510 of the capsule). The doses are deposited synchronised with the movement of the support 513 of the resting surface. In this specific case, both the separating device that carries the doses and the support surface that receives the doses from the separating device, are rotated by two respective conveying carousels that are synchronised together.

As said, the doses 512 are deposited on the resting surface (wall 510) with a peripheral distribution around a central zone. This central zone will then be occupied by the internal member 516 of the compression punch, which will obstruct the flow of plastics to prevent the material entering this central zone. The intermediate member 518 (of annular shape) will be moved to compress the doses 512 at the position of depositing the doses, i.e. in the peripheral zone around the central zone. This peripheral zone will be the zone where the (annular) moulding chamber 519 will be defined in which the seal will be formed.

The invention claimed is:

1. A method for forming an object from plastics material, said method comprising the step of compression-molding plastics material inside a molding chamber having at least a chamber portion of annular shape, wherein it comprises the step of arranging at least two doses of said plastics material inside said annular chamber portion, said at least two doses being separated from one another before said compression molding and being joined to one another by said compression molding, wherein said object comprises an annular seal of a closing element for containers, said at least two doses being arranged on a wall of said closing element and being compression-molded on said wall.

2. A method according to claim 1, wherein said closing element comprises an annular portion that extends from a periphery of said wall, said at least two doses being arranged on a peripheral zone of said wall adjacent to said annular portion.

3. A method according to claim 1, wherein said arranging step comprises arranging at least three doses of said plastics material that are not aligned together, said at least three doses being separated from one another before said compression molding and being joined to one another by said compression molding.

4. A method according to claim 1, wherein said arranging step comprises the steps of depositing said at least two doses on a resting surface and moving a molding tool to said resting surface, said molding tool and said resting surface cooperating to define said molding chamber.

5. A method according to claim 1, comprising, before said arranging step, the steps of extruding the plastics material through at least two extruding outlets, separating each of said at least two doses from the plastics material exiting each of said at least two extruding outlets and transferring said doses from said extruding outlets to a dose-release zone.

6. A method according to claim 5, wherein said separating step is performed by at least two movable separating tools that pass in front of said at least two extruding outlets separating and retaining said at least two doses.

7. A method according to claim 6, wherein, in said release zone, said at least two doses are detached from said at least two separating tools that retain the two doses which are then deposited on a resting surface that cooperates to define said molding chamber.

8. A method according to claim 1, wherein said compression-molding step comprises using a compression punch having at least an internal member that internally bounds said annular chamber portion and defines an obstructing limit of the plastics material during said compression molding.

9. A method according to claim 1, wherein four or more doses of said plastics material are disposed inside said annular chamber portion, said four or more doses being separated from one another before said compression molding and being joined to one another by said compression molding.

10. A method according to claim 1, wherein said chamber portion has a closed annular shape.

11. A method according to claim 1, wherein said chamber portion has a circular shape.

12. A method according to claim 1, wherein said at least two doses of plastics material are made of two different plastics material and/or have shapes that are different from one another.

* * * * *